(12) United States Patent
Ethington et al.

(10) Patent No.: US 11,328,334 B1
(45) Date of Patent: May 10, 2022

(54) WEARABLE ELECTRONIC DEVICES FOR AUTOMATED SHOPPING AND BUDGETING WITH A WEARABLE SENSOR

(71) Applicant: United Services Automobile Association (USAA), San Antonio, TX (US)

(72) Inventors: Seth Ethington, McKinney, TX (US); Amy R. Marquez, San Antonio, TX (US); Corey Pickrel, San Antonio, TX (US); Heather Hernandez, San Antonio, TX (US); Zakery L. Johnson, Santa Clara, UT (US); Michael Scott McQuarrie, San Antonio, TX (US); Sharon K. Haverlah, Bulverde, TX (US); Gabriel C. Fernandez, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 609 days.

(21) Appl. No.: 14/699,786

(22) Filed: Apr. 29, 2015

Related U.S. Application Data

(60) Provisional application No. 61/986,797, filed on Apr. 30, 2014.

(51) Int. Cl.
| | |
|---|---|
| G06Q 30/06 | (2012.01) |
| G09B 19/00 | (2006.01) |
| G09B 5/00 | (2006.01) |
| G06K 9/00 | (2022.01) |
| G06T 19/00 | (2011.01) |
| G02B 27/01 | (2006.01) |

(52) U.S. Cl.
CPC ....... *G06Q 30/0623* (2013.01); *G02B 27/017* (2013.01); *G06K 9/00671* (2013.01); *G06T 19/006* (2013.01); *G09B 5/00* (2013.01); *G09B 19/0092* (2013.01); *G02B 2027/0178* (2013.01)

(58) Field of Classification Search
CPC ............. G06Q 30/0623; G06Q 30/0601–0645
USPC .............................................. 705/26.1–27.2
See application file for complete search history.

(56) References Cited

U.S. PATENT DOCUMENTS

| | | | | |
|---|---|---|---|---|
| 2007/0073592 | A1* | 3/2007 | Perry ................. | G06Q 30/0601 705/26.1 |
| 2010/0262554 | A1* | 10/2010 | Elliott .................... | G01C 21/20 705/323 |
| 2012/0209773 | A1* | 8/2012 | Ranganathan ......... | G06Q 20/40 705/44 |

(Continued)

OTHER PUBLICATIONS

Kimberly Palmer "Can you afford it? Theres an App for that" (Apr. 10, 2012)—https://money.usnews.com/money/blogs/alpha-consumer/2012/04/10/can-you-afford-it-theres-an-app-for-that- (Year: 2012).*

(Continued)

*Primary Examiner* — Allison G Wood
*Assistant Examiner* — Jason B Warren

(57) ABSTRACT

A method, apparatus and system are disclosed for capturing an image of an item identifier by a wearable sensor. The item identifier can be analyzed to identify a specific item. The specific item can then be referenced to display information on the specific item, and display the results of analysis made with reference to the specific item.

16 Claims, 25 Drawing Sheets

(56) References Cited

U.S. PATENT DOCUMENTS

| | | | | |
|---|---|---|---|---|
| 2013/0290145 A1* | 10/2013 | Durst, Jr. | ............ | G06Q 30/0629 |
| | | | | 705/26.64 |
| 2013/0293530 A1* | 11/2013 | Perez | ................ | G06K 9/00671 |
| | | | | 345/418 |
| 2013/0317912 A1* | 11/2013 | Bittner | ............... | G06Q 30/0267 |
| | | | | 705/14.64 |
| 2013/0346168 A1* | 12/2013 | Zhou | ...................... | G06F 1/163 |
| | | | | 705/14.4 |
| 2014/0218269 A1* | 8/2014 | Cazalet | ............. | G02B 27/0176 |
| | | | | 345/8 |
| 2015/0012426 A1* | 1/2015 | Purves | ................ | G06Q 20/321 |
| | | | | 705/41 |

OTHER PUBLICATIONS

"ShopSavvy app adds Qr code support, augmented reality", by Chris Harnick, mobile commerce daily. 2010. (Year: 2010).*

* cited by examiner

WEARABLE ELECTRONIC DEVICES FOR AUTOMATED SHOPPING AND BUDGETING WITH A WEARABLE SENSOR

CROSS-REFERENCE TO RELATED APPLICATION

This application claims the benefit of U.S. Provisional Patent Application Ser. No. 61/986,797, filed on Apr. 30, 2014, which is hereby incorporated by reference herein in its entirety.

BACKGROUND

Shopping has been known to be a tedious endeavor for even the most experienced shoppers. The risk of getting lost while en route to a new shopping center, or getting lost within a new shopping center was a real possibility that costs the shopper valuable time and effort. Also, bargain shoppers could not be sure that the merchandise they were buying was the best deal currently available to them.

Therefore, there is a need for an apparatus and method that will assist a shopper during various shopping experiences.

SUMMARY

An aspect of the present disclosure relates to an electronic device that is wearable by a user such as a shopper engaged in one or more shopping activities. This wearable device may be in the form of eyewear that the user may wear over their eyes. Additionally, the wearable device may include one or more sensors, one or more input components, and one or more output components.

According to an aspect of the present invention, a wearable electronic device is disclosed that may include an image capturing device configured to capture an image within a field of view of the image capturing device in response to an input from a wearer of the wearable electronic device, a positioning system configured to identify a location of the electronic device, a display unit configured to display information to a wearer of the wearable electronic device and a controller. The controller may be configured to automatically analyze the captured image and recognize an item identifier from the captured image based on the analysis, and obtain information corresponding to an item represented by the item identifier. The controller may further obtain merchant information identifying a merchant that offers a same item where the merchant is located at a different location within a specified distance from the location of the wearable electronic device. The controller may then be configured to control the display unit to display to the wearer of the wearable electronic device the merchant information that offers the same item. In other aspects, a shopping list may be generated with, or displayed by, the wearable electronic device, and budget information, item location information, nutritional values for food items and comparisons with items available at competing stores may be displayed and manipulated on the wearable device while the wearer is shopping.

Other systems, methods, and features will be, or will become apparent to one with skill in the art upon examination of the following figures and detailed description. It is intended that all such additional systems, methods, and features included within this description, be within the scope of the disclosure, and be protected by the following claims.

BRIEF DESCRIPTION OF THE DRAWINGS

The present invention may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 2-1 illustrates a shopping system including the wearable device communicating, either directly or indirectly, with one or more computer systems;

FIG. 2-2 illustrates a computer system;

FIG. 3-1 illustrates a flowchart describing an overview of a number of exemplary processes being implemented in accordance to the running of a shopping tool;

FIG. 3-2 illustrates an exemplary viewpoint and display of a wearable device;

FIG. 3-3 illustrates an exemplary viewpoint and display of a wearable device;

FIG. 4-1 illustrates a flowchart describing an overview of a number of exemplary processes being implemented in accordance to the running of a shopping tool;

FIG. 4-2 illustrates an exemplary viewpoint and display of a wearable device;

FIG. 5-1 illustrates a flowchart describing an overview of a number of exemplary processes being implemented in accordance to the running of a shopping tool;

FIG. 5-2 illustrates an exemplary viewpoint and display of a wearable device;

FIG. 6-1 illustrates a flowchart describing an overview of a number of exemplary processes being implemented in accordance to the running of a shopping tool;

FIG. 6-2 illustrates an exemplary viewpoint and display of a wearable device;

FIG. 7-1 illustrates a flowchart describing an overview of a number of exemplary processes being implemented in accordance to the running of a shopping tool;

FIG. 7-2 illustrates an exemplary viewpoint and display of a wearable device;

FIG. 8-1 illustrates a flowchart describing an overview of a number of exemplary processes being implemented in accordance to the running of a shopping tool;

FIG. 8-2 illustrates an exemplary viewpoint and display of a wearable device;

FIG. 8-3 illustrates an exemplary viewpoint and display of a wearable device;

FIG. 8-4 illustrates an exemplary viewpoint and display of a wearable device;

FIG. 8-5 illustrates an exemplary viewpoint and display of a wearable device;

FIG. 8-6 illustrates an exemplary viewpoint and display of a wearable device;

FIG. 8-7 illustrates an exemplary viewpoint and display of a wearable device;

FIG. 9-1 illustrates a flowchart describing an overview of a number of exemplary processes being implemented in accordance to the running of a shopping tool;

FIG. 9-2 illustrates an exemplary viewpoint and display of a wearable device;

DETAILED DESCRIPTION

The present invention as described herein may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

Figure 1:
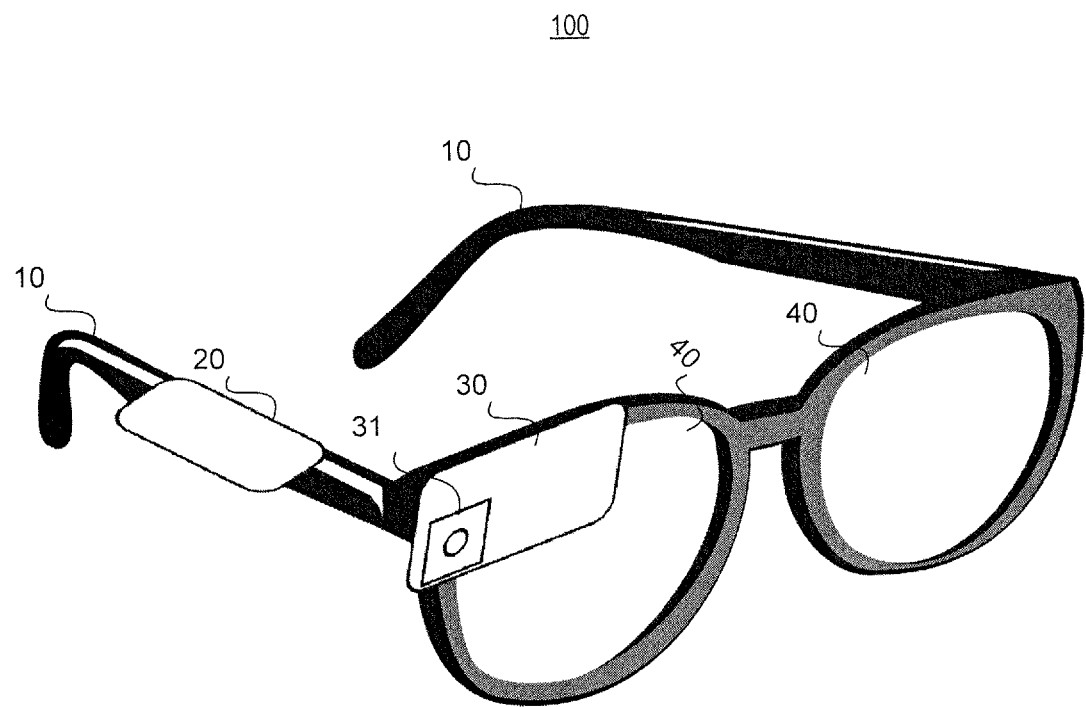
FIG. 1 illustrates an exemplary wearable device.

FIG. 1 illustrates a wearable device 100 that may, for example, take the form of eye wear configured to be worn over a user's eyes (for example, Google glasses). The wearable device 100 may include a combination of one or more of the following components illustrated in FIG. 1: arm portions 10, a computing system 20, a display unit 30, a camera unit 31, and a pair of lenses 40. The computing system 20 may include one or more components described in the computer system 200 described with reference to FIG. 2-2. Although the wearable device 100 is illustrated in FIG. 1 as including all of the components described above, this is provided for exemplary purposes only. It is within the scope of the innovation for the wearable device 100 to be comprised of fewer, or more, components than illustrated in FIG. 1. The components may be integrated into the wearable device 100, or may be discreet elements irremovably attached to the wearable device 100.

Figures 1, 2:
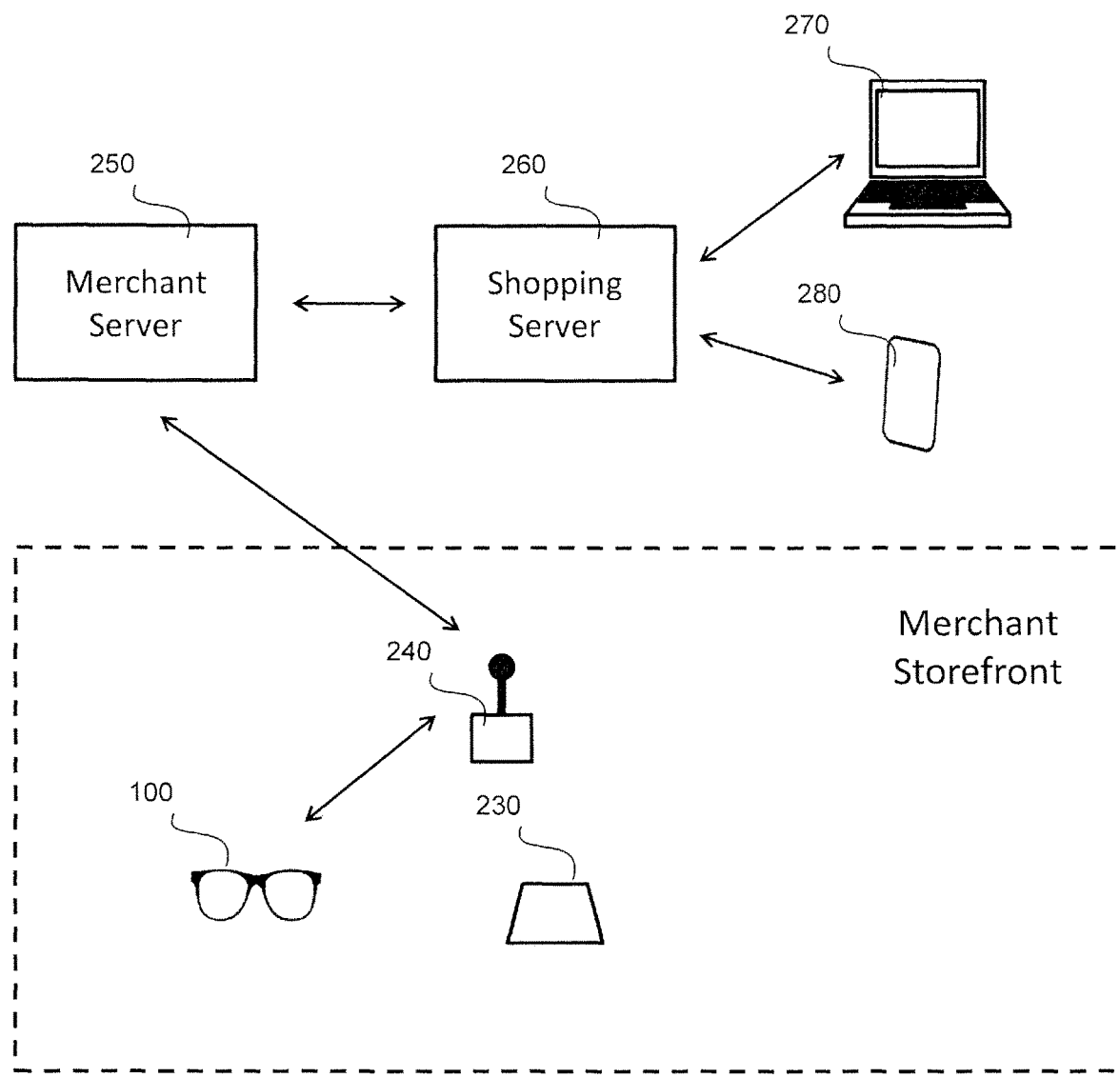
Figure 2:
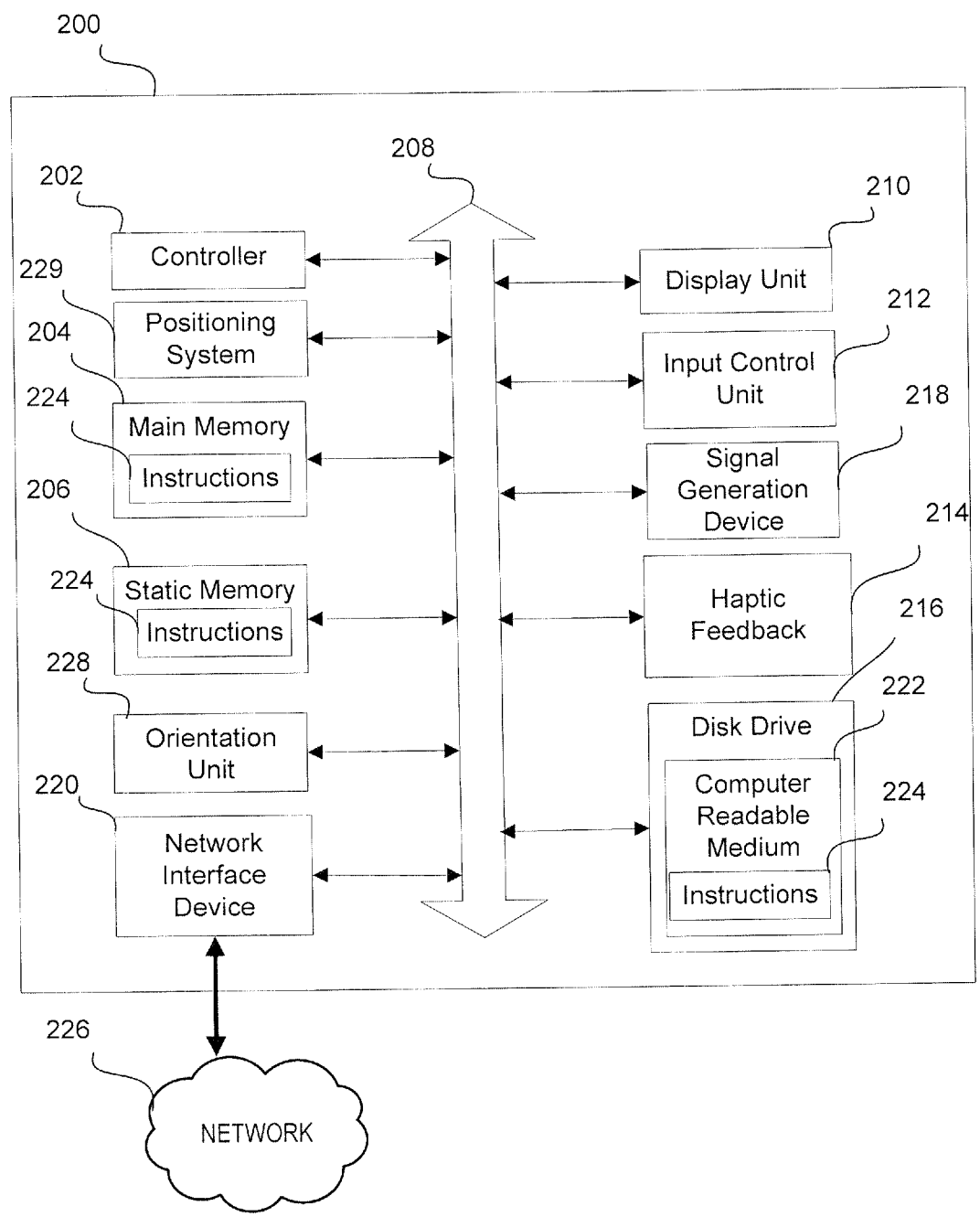

FIG. 2-1 illustrates a system that includes the wearable device 100. This system exemplifies the wearable device 100 being located within a merchant's storefront and communicating with the merchant's transmitter/receiver device 240, which may communicate with the merchant server 250, which may communicate with the shopping server 260, which may communicate with the laptop computer 270 and/or the smartphone 280. Each of the computer systems described in FIG. 2-1 may correspond to the computer system 200 illustrated in FIG. 2-2 below.

In the system illustrated in FIG. 2-1, the wearable device 100 is located within a merchant storefront. The storefront may be a physical location where the merchant has its place of business. Once located inside the merchant storefront, the wearable device 100 may detect the merchant's transmitter/receiver device 240 according to a location based communication protocol (for example, Near Frequency Communication, Bluetooth, etc.) or other available communication protocol described herein. After detecting the transmitter/receiver device 240, the wearable device 100 may receive information corresponding to the merchant from the transmitter/receiver device 240 directly. In addition or alternatively, the merchant's transmitter/receiver device 240 may direct the wearable device 100 to the merchant server 250 to receive the information. The information received may, for example, be identification information corresponding to the merchant (for example, name, address, location, contact information including phone, email, and website information, etc.), as well as other information such as promotional deals being offered by the merchant.

At some time either before or after communicating with the merchant's transmitter/receiver device 240, the wearable device 100 may capture an image of an object 230 within the merchant storefront. The object may be, for example, an item identifier (for example, QR code, barcode), merchandise item, or some other recognizable object as described herein. After capturing the image of the object 230, the wearable device 100 may transmit information on the object 230 to the merchant server 250, either directly or via the merchant transmitter/receiver device 240. The information transmitted to the merchant server 250 may be the captured image of the object 230, or additional information corresponding to the object 230 as obtained by the wearable device 100 according to any one or more of the processes described herein (for example, pricing information on the object 230).

In addition or alternatively, the information transmitted to the merchant server 250 may include a request to purchase the object 230 from the merchant. In such cases, the merchant server 250 may communicate a payment request to a shopping server 260. The shopping server 260 may be a financial institution server that belongs to a financial institution at which a shopper utilizing the wearable device 100 holds one or more financial accounts (for example, checking account, savings account, retirement account, etc.) at. By communicating with the shopping server 260, the merchant server 250 may request payment from the shopper via the shopper's financial account with the financial institution. When such a request is received from the merchant server 250, the shopping server 260 may locate the shopper's financial account and process the sales transaction to debit the appropriate amount of funds from the shopper's account to credit the merchant's account. After the sales transaction is completed between the shopping server 260 and the merchant server 250, a confirmation message of the successful sales transaction may be transmitted back to the wearable device 100 to be presented to the shopper. This confirmation message may be generated either by the shopping server 260 or the merchant server 250.

In addition or alternatively, the shopping server 260 may correspond to a shopping vendor that previously distributed a shopping tool to shoppers to run on the wearable device 100. In this way, the shopping vendor may communicate with a computer system running the shopping tool to allow the shopping tool to accomplish desired features. The features of such a shopping tool are provided throughout this disclosure. For example, the shopping server 260 may be capable of receiving a digital image or digital video files captured and transmitted by a computer system running the shopping tool, and analyzing the digital image or digital video files in order to recognize one or more objects from the captured image or digital video file as requested by the shopping tool. Information corresponding to the recognized objects may also be stored on the shopping server 260 such that the information may be transmitted back to the computer system running the shopping tool in response to a request for such information from the shopping tool.

The shopping vendor's shopping server 260 may communicate with the merchant server 250 to obtain current shopping promotions being offered to the shopper based on previously negotiated deals between the shopping vendor and the merchant. For example, when the wearable device 100 transmits a request for more information on the object 230 to the merchant server 250, the merchant server 250 may in turn transmit a request for more information on the object 230 to the shopping server 260. The shopping server 260 may receive such a request from the merchant server 250 and initiate a procedure to obtain information related to the object 230, and/or the merchant offering the object 230 for sale. After obtaining such information, the shopping server 260 may transmit the resulting information back to the merchant server 250, and the merchant server 250 may transmit the information back to the wearable device 100 for presentation to the shopper either directly, or via the transmitting/receiving device 240. Alternatively, the shopping server 260 may transmit the information back to the wearable device 100 for presentation to the shopper either directly, or via the transmitting/receiving device 240.

In some embodiments, the wearable device 100 may communicate with the shopping server 260 directly to obtain information on an object 230. Similarly, a computing device 270 (for example, laptop computer) or smartphone type device 280 (for example, smartphone, tablet, phablet, personal digital assistant, etc.) may communicate with the shopping server 260 directly in order to obtain information on an object 230 according to any one of the processes described herein. For example, the request for information on the object 230 that is transmitted to the shopping server 260 may include a captured image of the object 230 along with a request for information. The shopping server 260 may receive such request for information and analyze the captured image in order to identify the object 230. After identifying the object 230 from the captured image, the shopping server 260 may parse a database of object information stored on a memory of the shopping server 260 to obtain information corresponding to the identified object 230 as identified in the request, or as corresponding to the object 230 in general. After obtaining the information from the database the shopping server 260 may transmit the information back to the wearable device 100, computing device 270, or smartphone type device 280.

The wearable device 100 may communicate with the merchant server 250 or shopping server 260 via any number of communication methods, such as those described above. In some implementations, the wearable device 100 may utilize the communication capability of any number of additional or alternative electronic devices. For example, the wearable device may establish a direct communication link with a mobile device of a user, for example, a smartphone, tablet, or mobile phone carried by a user of the wearable device 100. Example communication links may include Bluetooth, any 802.11 connection, NFC, and more. The electronic device may have increased communication capabilities compared to the wearable device 100, and may be an intermediate communication device through which the wearable device 100 transmits or receives data for any of the shopping or budget analysis described herein. For example, the wearable device 100 may communicate with a smartphone that is in communication with the merchant server 250 and/or shopping server 260 through a wireless communication link, such as a cellular, 802.11 Wi-Fi, or any other type of communication link. In this example, the wearable device 100 may bypass or forego communication through the merchant's transmitter/receiver device 240, instead establishing a communication link with external servers or devices (such as the merchant server 250 or shopping server 260) through one or more intermediate communication devices or a direct communication link.

Additional descriptions for other processes involving one or more of the components as illustrated by the system in FIG. 2-1 are provided throughout this disclosure.

Referring to FIG. 2-2, an illustrative embodiment of a computer system that may be used for one or more of the components illustrated by the system in FIG. 1, or in any other system configured to carry out the methods discussed in this disclosure herein, is shown and is designated 200. Although the computer system 200 is illustrated in FIG. 2-2 as including all of the components as illustrated, it is within the scope of this innovation for the computing system to be comprised of fewer, or more, components than just illustrated in FIG. 2-2.

The computer system 200 can include a set of instructions 224 that can be executed to cause the computer system 200 to perform any one or more of the methods, processes or computer-based functions disclosed herein. For example, a shopping tool as described herein may be a program comprised of a set of instructions 224 that are executed by the controller 202 to cause the wearable device 100 to perform any one or more of the methods, processes or computer-based functions described herein. Such a program may be stored in whole, or in any combination of parts, on one or more of the exemplary memory components illustrated in FIG. 2-2, such as the main memory 204, static memory 206, or disk drive 216.

As described, the computer system 200 may be mobile device such as the wearable device 100. The computer system 200 may also be connected using a network 226, to other computer systems or peripheral devices. In a networked deployment, the computer system 200 may operate in the capacity of a server or as a client user computer in a server-client user network environment, or as a peer computer system in a peer-to-peer (or distributed) network environment. In addition to embodiments in which the computer system 200 is implemented as a wearable device, the computer system 200 may also be implemented as, or incorporated into, various devices, such as a personal computer ("PC"), a tablet PC, a set-top box ("STB"), a personal digital assistant ("PDA"), a mobile device such as a smart phone or tablet, a palmtop computer, a laptop computer, a desktop computer, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a controller 202, such as a central processing unit ("CPU"), a graphics processing unit ("GPU"), or both. Moreover, the computer system 200 can include a main memory 204, and additionally may include a static memory 206. In embodiments where more than one memory components are included in the computer system 200, the memory components can communicate with each other via a bus 208. As shown, the computer system 200 may further include a display unit 210, such as a liquid crystal display ("LCD"), an organic light emitting diode ("OLED"), a flat panel display, a solid state display, or a cathode ray tube ("CRT"). The display unit 210 may, for example, correspond to the display unit 30 of the wearable device 100 as illustrated in FIG. 1. Additionally, the computer system 200 may include one or more input devices 212, such as a keyboard, push button(s), scroll wheel, digital camera for image capture and/or visual command recognition, touch screen, touchpad or audio input device (for example, microphone). The computer system 200 can also include signal outputting components such as a haptic feedback component 214 and a signal generation device 218 that may include a speaker or remote control.

The computer system 200 may additionally include a GPS (Global Positioning System) component 229 for identifying a location of the computer system 200. The positioning system 229 may be a hardware received or software for working in conjunction with a remotely located received. In alternative embodiments, the positioning system may be an IPS (Indoor Positioning System) to assist with accurate location of the computer system inside of buildings, where GPS reception may not be as reliable and accurate. A combination of both GPS and IPS functionality may be integrated in the positioning system 229. Additionally, the computer system 200 may include an inertial orientation unit 228 that includes any combination of one or more gyroscope(s) and accelerometer(s).

The computer system 200 may also include a network interface device 220 to allow the computer system 200 to communicate via wireless, or wired, communication channels with other devices. The network interface device 220 may be an interface for communicating with another computer system via a Wi-Fi connection, Bluetooth connection, Near Frequency Communication connection, telecommunications connection, internet connection, wired Ethernet connection, or the like. The computer system 200 may also optionally include a disk drive unit 216 for accepting a computer readable medium 222. The computer readable medium 222 may include a set of instructions that are executable by the controller 202, and/or the computer readable medium 222 may be utilized by the computer system 200 as additional memory storage.

In a particular embodiment, as depicted in FIG. 2, the disk drive unit 216 may include a computer-readable medium 222 in which one or more sets of instructions 224, such as software, can be embedded. Further, the instructions 224 may embody one or more of the methods, processes, or logic as described herein. In a particular embodiment, the instructions 224 may reside completely, or at least partially, within the main memory 204, the static memory 206, and/or within the controller 202 during execution by the computer system 200. The main memory 204 and the controller 202 also may include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present computer system 200 may encompass software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 222 that includes instructions 224 or receives and executes instructions 224 responsive to a propagated signal; so that a device connected to a network 226 can communicate voice, video or data over the network 226. Further, the instructions 224 may be transmitted or received over the network 226 via the network interface device 220.

While the computer-readable medium 224 is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium 222 can include a solid-state memory such as a memory card or other package that houses one or more non-volatile read-only memories, such as flash memory. Further, the computer-readable medium 222 can be a random access memory or other volatile re-writable memory. Additionally, the computer-readable medium 222 can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium 222 or a distribution medium and other equivalents and successor media, in which data or instructions may be stored.

Although the present specification describes components and functions that may be implemented in particular embodiments with reference to particular standards and protocols commonly used by financial institutions, the invention is not limited to such standards and protocols. For example, standards for Internet and other packet switched network transmission (for example, TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

Figures 1, 3:
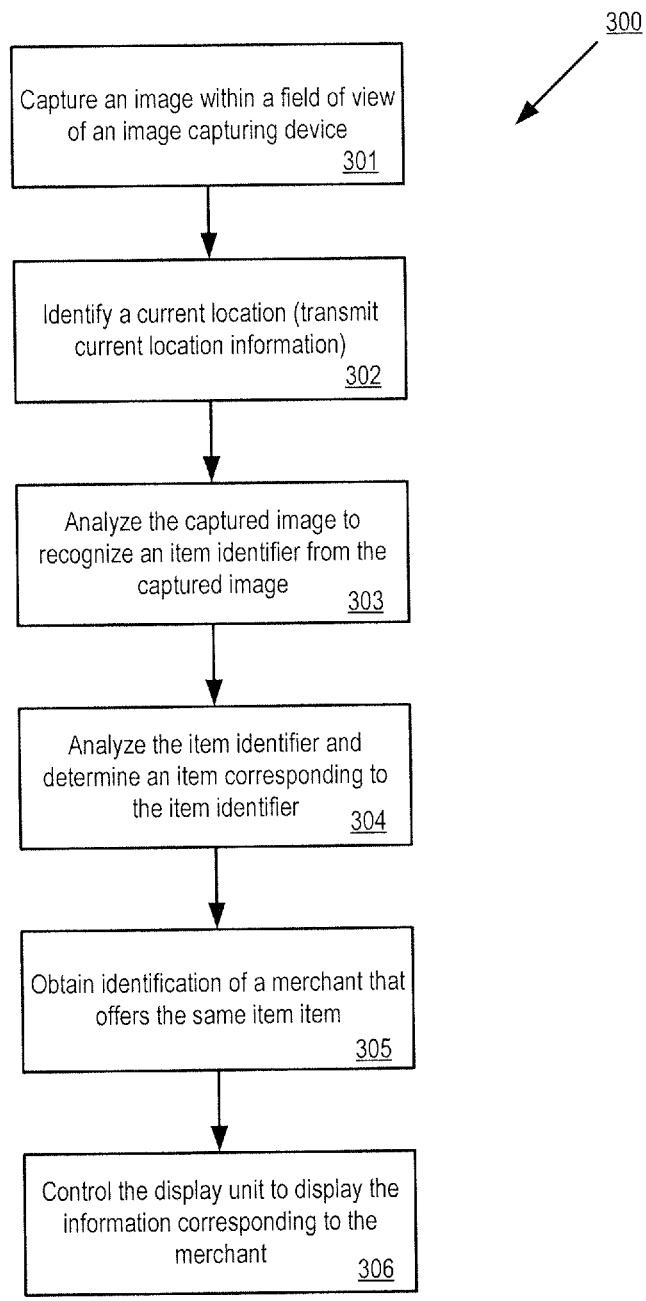
Figures 2, 3:
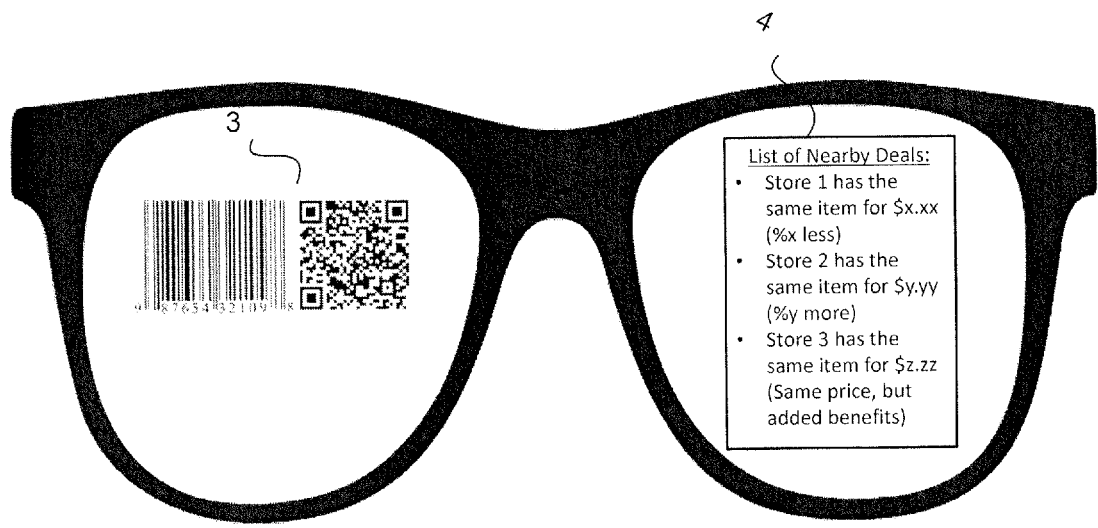
Figure 3:

FIG. 3-1 illustrates an exemplary flow chart 300 describing a process being implemented by a shopping tool to assist a shopper in identifying an item located at a current merchant, locating the same item at another merchant(s), and providing comparative analysis between on the item being offered at two or more merchants. The shopping tool may be, for example, a program running (such as a set of instructions stored on a memory and being executed by a processor) on the wearable device 100, remotely via the wearable device 100 from a remote server, or from both locations. FIGS. 3-2 to 3-3 illustrate the wearable device 100 being utilized by the shopping tool as the shopping tool runs on the wearable device 100 according to the processes of flow chart 300. It follows that the wearable device 100 illustrated in FIGS. 3-2 to 3-3 may be referenced during the description of the processes exemplified by flow chart 300 below.

At 301, an image within a field of view of the wearable device 100 may be captured. For example, FIG. 3-2 illustrates the wearable device 100 capturing an image of a barcode and/or QR code 3 that is within the left-side field of view of the wearable device 100. The captured image may be a still digital image, or part of a digital video such as a frame, or segment, from the digital video.

The image capturing may be initiated by the shopper's input command via any one or more of the components described as part of the input control unit 212. For example, the shopper's input command may be a push button input into a keyboard or push button, a turn of a scroll wheel, a specific gesture command captured by an image capture or video capture device, a touch input into a touch pad, or a voice command received by a microphone. With respect to the gesture command recognition, an image capturing device of the wearable device 100 may be capturing images or video of objects within the field of view of the wearable device 100 in order to monitor the field of view for specific gesture commands by the shopper. The captured images or videos may be analyzed by the shopping tool in order to recognize one or more of the specific gesture commands that may be identified in a database memory of the wearable device 100. For example, a gesture by the shopper to point to a specific object (for example, item identifier or merchandise item) with a digit (for example, finger or other pointed object) may be recognized by the shopping tool as a gesture command to capture an image or begin video recording by the image capturing device of the wearable device 100. The image capturing device may further be configured to capture an image within a specified radius, box, or other area within relation to a proximity to the recognized digit. For example, the image capturing device may focus on capturing an image within a specified radius, box, or other area within relation to a tip of the shopper's finger as recognized from the field of view.

In addition or alternatively, the captured images or videos may be analyzed by the shopping tool in order to recognize a specified object within the field of view of the wearable device 100 that may be referenced for further processing according to the process described by flow chart 300. For example, the recognition of an item identifier (for example, QR code or barcode) within the field of view may be recognized by the shopping tool such that an image or video segment that includes an image of the item identifier will be identified for further reference by the process described in flow chart 300.

In addition, the image capturing device may also include the capability to capture images of the shopper's eyes. In this way, the recognition by the shopping tool of a specified gesture by one or more of the shopper's eyes (for example, single eye blink, double eye blink, single eye specified series of blinks, double eye specified series of blinks) may initiate an image capture or video segment capture by the image capturing device of the wearable device 100 of a field of view of the wearable device 100.

At 302, a current location of the wearable device 100 is identified by a location identifying component of the wearable device 100. For example, a location identifying component may be a GPS component as described in this disclosure. The determination of the current location at 302 may include a determination of a current merchant in which the shopper wearing the wearable device 100 is presently located. In some embodiments the current location information may further be transmitted to an off-site server tasked with keeping track of the wearable device 100. For example, the off-site server may be the merchant server 250 or shopping server 260 as illustrated in FIG. 2-1.

At 303, the image captured at 301 is analyzed in order to recognize an item identifier from the captured image. For example, the item identifier may be a barcode and/or QR code 3 as illustrated in FIG. 3-2. In addition or alternatively, the item identifier may be a recognizable title, label, or some other similar distinguishing characteristic of the merchandise item. The item identifier may be written on a packaging, tag, or other location related to the merchandise item that distinguishes the item identifier as belonging to the merchandise item.

At 304, the item identifier is analyzed in order to determine the merchandise item that corresponds to the item identifier. For example, in embodiments where the item identifier is a barcode, QR code, or some other easily identifiable type of item identifier, the item identifier may be referenced against a database of known item identifiers in order to determine the merchandise item that corresponds to the analyzed item identifier. In other embodiments where the item identifier is determined to be a recognizable title, label, or other type of item identifier that requires additional image recognition processing, the process at 304 may include an image recognition process for identifying the title, label or other type of item identifier in order to determine the corresponding merchandise item.

Based on the identification of the merchandise item corresponding to the captured item identifier at 304, the pricing of the merchandise item may also be determined as part of the analysis at 304.

At 305, identification of another merchant that offers the same merchandise item identified at 304 is obtained. For example, obtaining the identification of the other merchant may include transmitting a request to an off-site server. For example, the off-site server may be the merchant server 250 or shopping server 260 as illustrated in FIG. 2-1. The request may include information identifying the merchandise item identified at 304, as well as the current location information identified at 302, and the current merchant information. The off-site server may receive such a request and initiate a process for determining a different merchant that carriers the same merchandise item. The process may additional be run to determine the different merchant that carries the same merchandise item that is also located less than a predetermined distance from the current location.

In addition or alternatively, this request may be transmitted internally within the wearable device 100 itself. For example, the wearable device 100 may store a look up table in a memory of the wearable device 100, where the look up table includes merchandise item inventory information for a number of merchants, as well as location information for each of the merchants. This way, even when the request is made within the wearable device 100, a process may be implemented for obtaining information on another merchant that carries the same merchandise item as identified at 304, which may also be located less than a predetermined distance from the current location.

In addition or alternatively, the merchant information obtained at 305 may correspond to a list of merchants that have previously signed up for a cross promotional relationship with an entity that corresponds to the shopping tool. For example, the shopping tool may have been developed by a financial institution and downloaded onto the wearable device from a financial institution server. The financial institution may, for example, correspond to a financial account (for example, credit card, debit card, reward card) of the shopper running the shopping tool on the wearable device 100. The cross promotional relationship may have been agreed upon between the financial institution and one or more merchants to provide customers of the financial institution (for example, the shopper) additional discounts or other beneficial promotions when shopping at the merchants included in the cross promotional relationship. Alternatively, the cross promotional relationship may have been agreed upon between the financial institution customer (for example, the shopper) and one or more merchants by the customer signing up with the merchants included in the cross promotional relationship.

At 306, the new merchant information obtained at 305 will be displayed. For example, the information may be displayed on the display unit 30 of the wearable device 100.

FIGS. 3-2 and 3-3 illustrate two exemplary displays that may be displayed according to the process described with reference to flow chart 300.

FIG. 3-2 illustrates an exemplary display of a list 4 that includes a number of merchants (for example, new merchant information identified at 305) that sell the same merchandise item as identified at 304. The exemplary list 4 is illustrated to include three different merchants that are located, for example, within a predetermined distance from the current location identified at 302.

In addition or alternatively, each additional new merchant included in the list 4 may be displayed along with a corresponding message. The corresponding message may have been generated by the shopping tool at 305 after obtaining the merchant identification information. For example, the corresponding message may identify a difference in price of the merchandise item as sold by the current merchant versus the new merchant(s) obtained from the process at 305. The message itself may identify the difference in price in terms of a monetary, or percentage, difference. In another example, the corresponding message may identify additional benefits that may be available at one or more of the new merchants identified at 305. Exemplary additional benefits may include promotional deals that are being offered by the new merchant for buying the merchandise item (for example, buy the merchandise item and also receive an additional item).

FIG. 3-3 illustrates an exemplary display that identifies a number of merchants obtained from the process at 305 that are currently within a field of view of the wearable device 100. Alternatively, the display within the right field of view including displays 5-7 may be a superimposed display of a map that identifies the location of stores 1-3. In this way FIG. 3-3 illustrates a location icon ('x') that is displayed on the display unit 30 to be superimposed over the new merchant(s) (such as a store) obtained at 305. The superimposed location icon ('x') may also be displayed with a corresponding message. For example, the corresponding message may identify a difference in price of the merchandise item at the current merchant versus the new merchant(s) that are identified as being within the current field of view of the wearable device 100. The message itself may identify the difference in price in terms of a monetary amount, or percentage, difference. As another example, the corresponding message may identify additional benefits that may be available at one or more of the new merchants that are within the current field of view of the wearable device 100. Exemplary additional benefits may include promotional deals that are being offered by the new merchant for buying the merchandise item (for example, buy the merchandise item and also receive an additional item).

Display 7 is comprised of a location icon ('x') and a corresponding message that identifies store 1 as selling the same merchandise item for a price that is a specified percentage less than the merchandise item being sold at the current merchant.

Display 5 is comprised of a location icon ('x') and a corresponding message that identifies store 2 as selling the same merchandise item for a price that is a specified percentage more than the merchandise item being sold at the current merchant.

Display 6 is comprised of a location icon ('x') and a corresponding message that identifies store 3 as selling the same merchandise item for a price that is the same as the merchandise item being sold at the current merchant. However, display 6 additionally includes a corresponding message that identifies an additional benefit to buying the same merchandise item at store 3 that may be an added incentive over the buying from the current merchant.

Although not specifically illustrated, the shopping tool described by flow chart 300 may include a process for generating a "worth it" score. The "worth it" score may be generated by inputting pricing information for the merchandise item at different merchants as well as each of the different merchant's distance from the shopper's current location (such as a distance from current merchant). Then, the input information may be compared with the price for the merchandise item being offered by the current merchant to determine the "worth it" score for the particular merchandise item. If one of the different merchants is found to offer the same merchandise item at a much cheaper price than the current merchant, and this particular different merchant is located very close to the current merchant, this different merchant may be assigned a high "worth it" score because it would be highly worth it for the shopper to travel to the different merchant to purchase the same merchandise item at the much lower price. Conversely, if one of the different merchants if found to offer the same merchandise item at a much higher price than the current merchant, and this particular different merchant is located very far from the current merchant, this different merchant may be assigned a low "worth it" score because it would not be worth it for the shopper to travel to the different merchant to purchase the same merchandise item at the much higher price.

Further, the parameters described as being utilized by the shopping tool during the processes described by flow chart 300 may be revised. For example, the shopper may input revised parameters into the wearable device 100 via any one or more of the input control devices that comprise the input control unit 212 of the wearable device 100. The revised parameters may then be referenced by the shopping tool to implement the process described by flow chart 300 in accordance to the new revised parameters. An exemplary parameter that may be revisable includes the predetermined distance from the current location at which the shopping tool will display new merchant information. For example, the shopper may set this predetermined distance parameter such that only merchants that are within 100 ft. from the current location are eligible for display on the display unit 30 at 306. After initially setting this predetermined distance, the shopper may increase or decrease this distance. Another exemplary parameter that may be revisable includes the difference in merchandise item pricing that allows a new merchant eligible for display on the display unit 30. For example, the shopper may set the differential pricing such that only new merchants that sell the same merchandise item at a cheaper price are displayed on the display unit 30 at 306. After initially setting this differential pricing, the shopper may revise this parameter to include merchants that sell the same merchandise item at a price that is within a specified amount, or percentage, (for example, $4 or 10%) of the current merchant's price.

In addition, the process described by flow chart 300 may have an additional step where the shopping tool automatically communicates with the current merchant to negotiate a new, cheaper (or otherwise better incentivized), deal. For example, after obtaining the identification information of merchants that offer the same merchandise item at 305 (or alternatively at the same, or nearly same, time as controlling the display unit at 306), the shopping tool running on the wearable device 100 may transmit a communication signal to a receiving device corresponding to the current merchant. This receiving device may, for example, be the current merchant's server 250 as illustrated in the system of FIG.

2-1. This receiving device may also be, for example, a transmitting/receiving device 240 corresponding to the current merchant as illustrated in the system of FIG. 2-1. in any case, the communication signal may be comprised of pricing information for one or more merchandise items being sold by the current merchant, pricing information for the same one or more merchandise items being sold by the one or more different merchants (for example, as identified at 305), and a request for a new offer from the current merchant. After receiving such information, the receiving device may analyze the information in view of the current merchant's pricing. Based on this analysis, the receiving device may determine the merchant is able to, or not able to, offer a lower (or better incentivized) deal on the one or more merchandise items. The determination information is then transmitted back to the wearable device 100, after which the information may be analyzed by the wearable device 100 and displayed on the display unit 30.

Figures 1, 4:
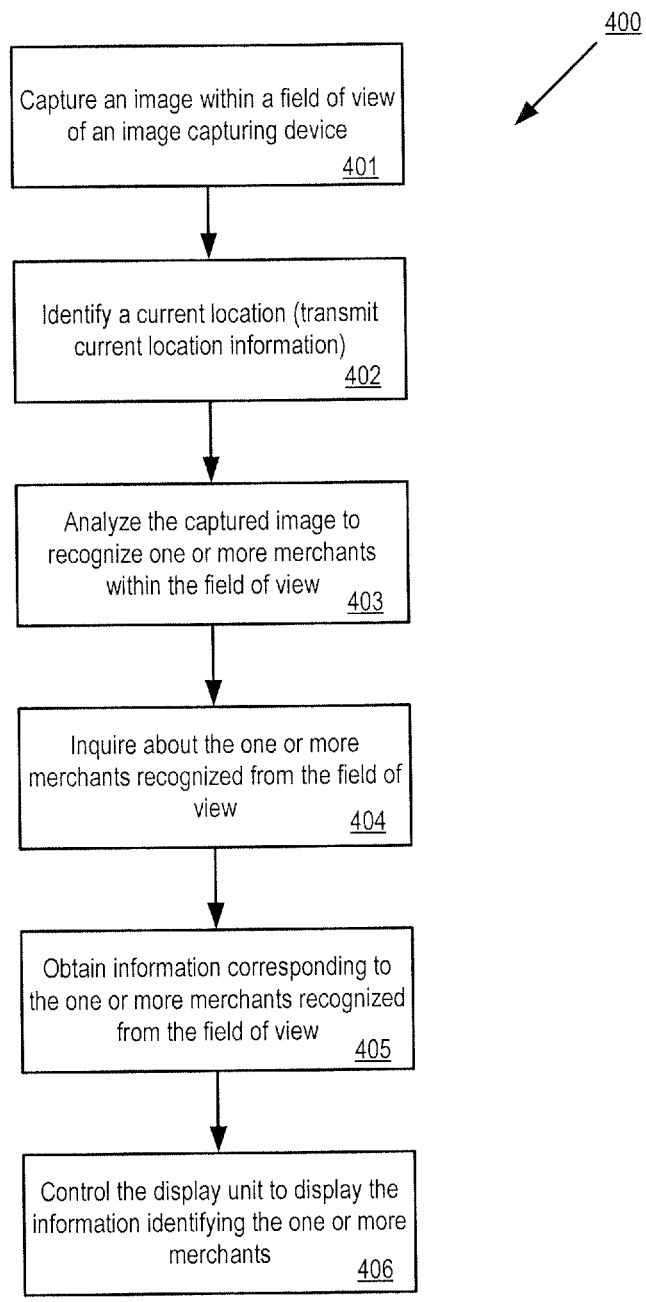
Figures 2, 4:
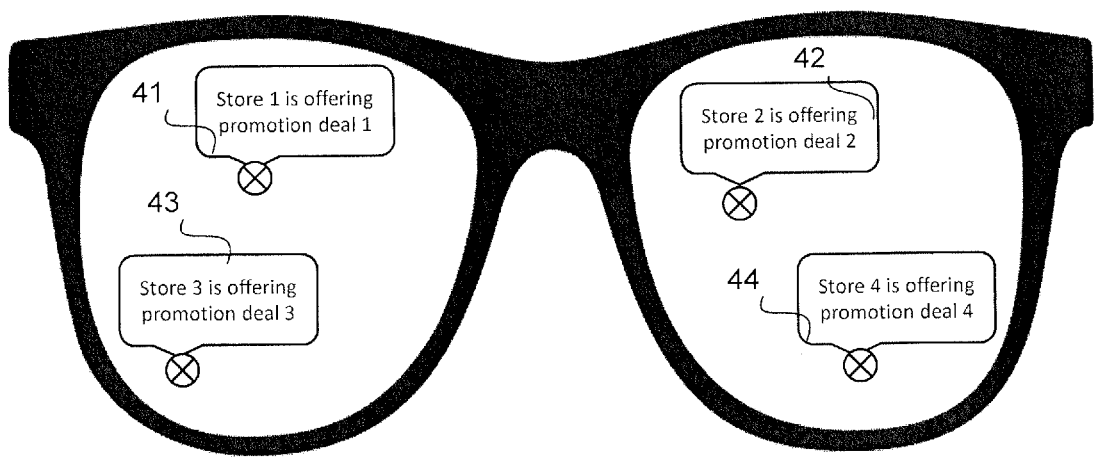

FIG. 4-1 illustrates an exemplary flow chart 400 describing a process that may be implemented by a shopping tool to assist a shopper in identifying a current location of the shopper, recognizing merchant(s) within a field of view of a wearable device 100 worn by the shopper, and then providing information corresponding to the merchant(s) that are recognized as being within the field of view of the wearable device 100. The shopping tool may be, for example, a program running (such as a set of instructions stored on a memory and being executed by a processor) on the wearable device 100, remotely via the wearable device 100 from a remote server, or from both locations. FIG. 4-2 illustrates an exemplary view and display from the viewpoint of the wearable device 100 during the running of the shopping tool described by the processes of flow chart 400.

At 401, an image within a field of view of the wearable device 100 may be captured. For example, FIG. 4-2 illustrates the wearable device 100 capturing an image of merchants that are within the field of view of the wearable device 100. The captured image may be a still digital image, or part of a digital video such as a frame, or segment, from the digital video. The process for initiating the image capturing may correspond to any one or more of the processes described herein (for example, as described with reference to flow chart 300).

At 402, a current location of the wearable device 100 may be identified by a location identifying component of the wearable device 100. For example, a location identifying component may be a GPS component as described, at least, elsewhere in this disclosure. The determination of the current location at 402 may include a determination of a current merchant in which the user wearing the wearable device 100 is presently located. In some embodiments the current location information may further be transmitted to an off-site server tasked with keeping track of the wearable device 100. For example, the off-site server may be the merchant server 250 or shopping server 260 as illustrated in FIG. 2-1.

At 403, the image captured at 401 is analyzed in order to recognize one or more merchants that are within the field of view of the wearable device 100. For example, FIG. 4-2 illustrates an exemplary field of view from the perspective of the wearable device 100 that recognizes four merchants (for example, stores 1-4). Recognizing the merchants from the captured image at 403 may include an image recognition process where the wearable device 100 is able to analyze the captured image, and recognize the name of the merchant included in the captured image based on the analysis. At the end of the process at 403, the identity of the merchant(s) included in the captured image may be obtained.

In addition or alternatively, recognizing the merchants at 403 may include an image recognition process where the wearable device 100 is able to analyze the captured image from 401, and in case the image does not include the characters that describe the merchant's name, the analysis may be able to determine the merchant's identity based on the look and/or dress of the merchant's storefront captured in the image. In such cases where the wearable device 100 analyzes the captured image in order to recognize the look and/or dress of the merchant's storefront, a number of suggested merchant identities may be generated by the wearable device 100 based on the analysis of the captured image. This list of suggested merchant identities may have been calculated by the wearable device 100 as a prediction for the real identify of the merchant(s) included in the captured image. The user may then select one or more merchant identities from the list of generated merchant suggestions by inputting a command via one or more of the input devices of the input control unit 212 described herein.

Although the above description of the process at 403 above has been provided as being executed by the wearable device 100, it is within the scope of the shopping tool described herein that in some embodiments the process at 403 may be outsourced to an off-site server. The off-site server may, for example, correspond to the merchant server 250 or shopping server 260 as illustrated within the system described in FIG. 2-1. In such embodiments, the wearable device 100 may transmit a request for recognizing the merchants in the image captured at 401 to the off-site server. This request may include at least the captured image. The off-site server may then execute any one or more of the image recognition processes described above with respect to 403, and then transmit the resulting identification of merchants back to the wearable device 100.

After receiving the identification information for the one or more merchants at 403, at 404 the wearable device 100 will transmit an inquiry about the identified merchants. This inquiry may be transmitted to an off-site server configured to receive the inquiry, analyze the identified merchants, and locate information corresponding to the identified merchants stored within its own memory component. For example, the off-site server may be the merchant server 250 or shopping server 260 as illustrated in FIG. 2-1. The off-site server may store information that includes additional information corresponding to merchants that may be of interest to the shopper. For example, the off-site server may be updated with current promotional deals that are offered by merchants.

In addition or alternatively, the inquiry may be transmitted internally within the wearable device 100 itself. For example, the wearable device 100 may store a look up table in a memory that has been updated with current information corresponding to merchants. The look up table may be updated with the current information periodically via communication with off-site servers such as those corresponding to the merchants. In this way, the inquiry at 404 may be kept within the wearable device 100.

At 405, the information corresponding to the identified merchants at 404 is obtained. This information may have been transmitted back to the wearable device 100 from the off-site server describe above with reference to process 404. This information may also have been received internally within the wearable device 100 following the internal inquiry described above with reference to process 404.

The information obtained at 405 may include current promotional deals being offered by the merchants, additional information related to the merchants (for example, merchant name, merchant address, merchant contact information, merchant hiring opportunities, directions, recent news related to the merchant), and/or other information related to the corresponding merchant recognized from the field of view of the wearable device 100.

At 406, a display unit of the wearable device 100 (for example, display unit 30) may be controlled to display the information received at 405. For example, FIG. 4-2 illustrates four separate displays 41-44 that correspond to four different merchants (stores) that are within the field of view of the wearable device 100.

Display 41 is comprised of a location icon ('x') as well as a corresponding message. The location icon identifies store 1 within the field of view of the wearable device 100, and the corresponding message presents additional information related to store 1 (for example, the information on the merchant received at 405). In this exemplary illustration, the corresponding message identifies a promotional deal 1 currently being run by store 1.

Display 42 is comprised of a location icon ('x') as well as a corresponding message. The location icon identifies store 2 within the field of view of the wearable device 100, and the corresponding message presents additional information related to store 2 (for example, the information on the merchant received at 405). In this exemplary illustration, the corresponding message identifies a promotional deal 2 currently being run by store 2.

Display 43 is comprised of a location icon ('x') as well as a corresponding message. The location icon identifies store 3 within the field of view of the wearable device 100, and the corresponding message presents additional information related to store 3 (for example, the information on the merchant received at 405). In this exemplary illustration, the corresponding message identifies a promotional deal 3 currently being run by store 3.

Display 44 is comprised of a location icon ('x') as well as a corresponding message. The location icon identifies store 4 within the field of view of the wearable device 100, and the corresponding message presents additional information related to store 4 (for example, the information on the merchant received at 405). In this exemplary illustration, the corresponding message identifies a promotional deal 4 currently being run by store 4.

Figures 1, 5:
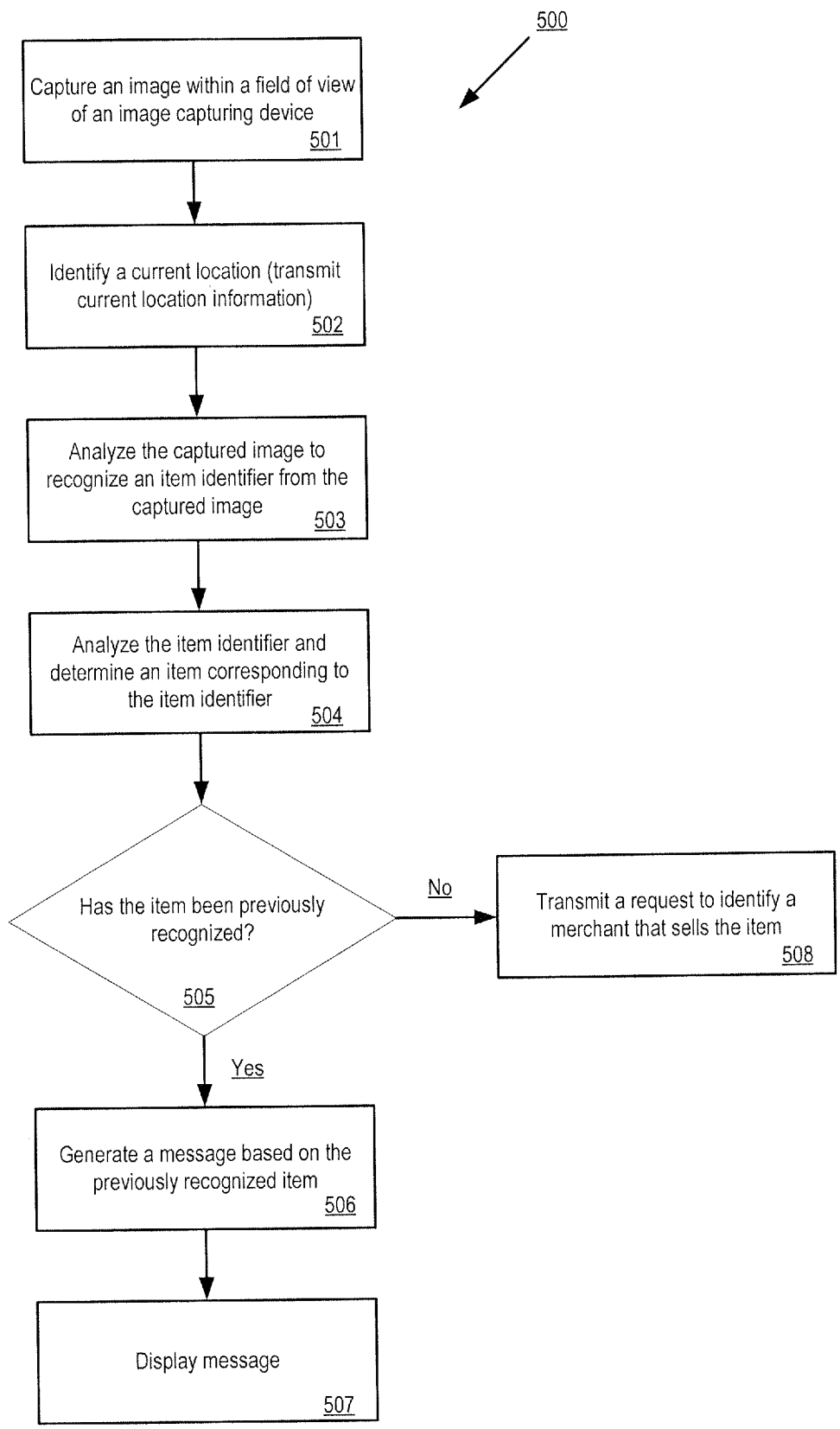
Figures 2, 5:
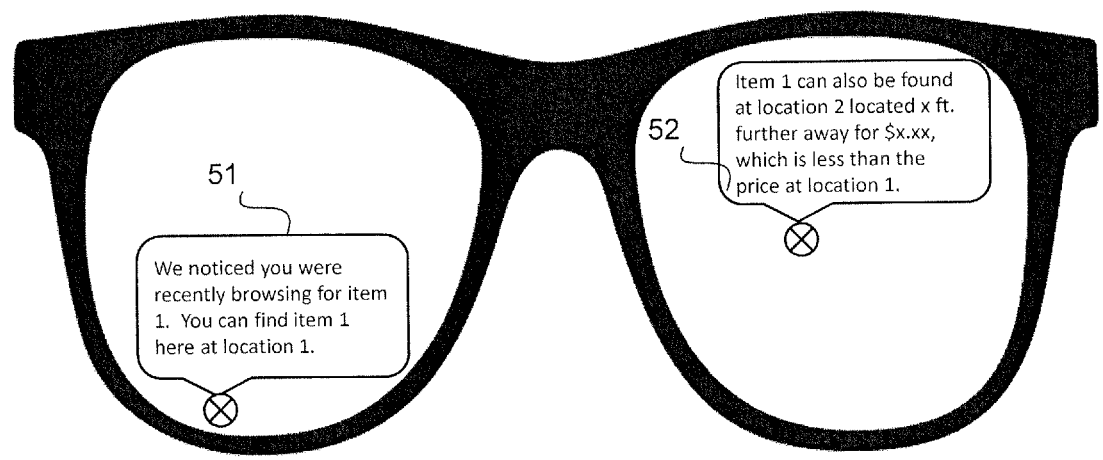

FIG. 5-1 illustrates an exemplary flow chart 500 describing a process that may be implemented by a shopping tool to assist a shopper in recognizing a previously identified merchandise item. The shopping tool may be, for example, a program running (such as a set of instructions stored on a memory and being executed by a processor) on the wearable device 100, remotely via the wearable device 100 from a remote server, or from both locations. FIG. 5-2 illustrates the wearable device 100 being utilized to implement the process described by the exemplary flow chart 500. It follows that the wearable device 100 illustrated in FIG. 5-2 may be referenced during the description of the shopping tool running on the wearable device 100 to implement the exemplary processes in flow chart 500 below.

At 501, an image within a field of view of the wearable device 100 may be captured. For example, the wearable device 100 may capture an image of a barcode and/or QR code 3 within the field of view of the wearable device 100. The captured image may be a still digital image, or a part of a digital video such as a frame, or segment, from the digital video. The captured image may be a still digital image, or part of a digital video such as a frame, or segment, from the digital video. The process for initiating the image capturing may correspond to any one or more of the processes described herein (for example, as described with reference to flow chart 300).

At 502, a current location of the wearable device 100 is identified by a location identifying component of the wearable device 100. For example, a location identifying component may be a GPS component as described, at least, elsewhere in this disclosure. The determination of the current location at 502 may include a determination of a current merchant in which the shopper wearing the wearable device 100 is presently located. In some embodiments the current location information may further be transmitted to an off-site server tasked with keeping track of the wearable device 100. For example, the off-site server may be the merchant server 250 or shopping server 260 as illustrated in FIG. 2-1.

At 503, the image captured at 501 is analyzed in order to recognize an item identifier from the captured image. For example, the item identifier may be a barcode and/or QR code. In addition or alternatively, the item identifier may be a recognizable title, label, or some other similar distinguishing characteristic of the merchandise item. The item identifier may be written on a packaging for the merchandise item, or may otherwise be located to correspond to the merchandise item (for example, the item identifier may be located on a tag attached to the merchandise item.

At 504, the item identifier is analyzed in order to determine the merchandise item that corresponds to the item identifier. For example, in embodiments where the item identifier is a barcode, QR code, or some other easily identifiable type of item identifier, the item identifier may be referenced against a database of known item identifiers in order to determine the merchandise item that corresponds to the analyzed item identifier. In other embodiments where the item identifier is determined to be a recognizable title, label, or other type of item identifier that requires additional image recognition processing, the process at 504 may include an image recognition process for identifying the title, label or other type of item identifier in order to determine the corresponding merchandise item.

In addition to identifying the merchandise item that corresponds to the captured item identifier, the pricing of the merchandise item may also be determined based on the analysis of the item identifier at 504.

At 505, a determination is made as to whether the merchandise item identified at 504 has been previously recognized. For example, the merchandise item may have been recognized at another merchant store during a prior running of the shopping tool. If so, the shopping tool may have previously saved information corresponding to the merchandise item from the prior running of the shopping tool within a memory of the wearable device 100. The information may include a time/date at which the merchandise item was previously recognized, identification information of the merchandise item, identification information for the merchant at which the merchandise item was previously recognized, and a location at which the merchandise item was previously recognized. It follows that the wearable device 100 may reference previously stored merchandise information at 505 in order to determine whether the merchandise item has been previously recognized. Although 505 has been described as the shopping tool previously saving the merchandise information within a memory of the wearable device 100, it is also within the scope of the shopping tool described herein to have previously stored such information on an off-site server. For example, the off-site server may be the merchant server 250 or shopping server 260 as illustrated in FIG. 2-1. In such embodiments, the shopping tool may retrieve the previously stored information from the off-site server in order to make the determination at 505.

If it is determined at 505 that the merchandise item was previously recognized, then at 506 a message may be generated based on the previously recognized merchandise item. The message may include information corresponding to the previously recognized merchandise item, as described above. In addition or alternatively, the message may include information on a current promotion being offered by the merchant in which the shopper is currently located.

At 507, the message generated at 506 may be displayed on a display unit 30 of the wearable device, as illustrated in FIG. 5-2. FIG. 5-2 illustrated an exemplary display according to the process described by flow chart 500. As illustrated in FIG. 3-4, it is within the scope of this wearable device 100 to be capable of supporting a display unit over both left and right fields of view.

With regards to the display illustrated by FIG. 5-2, display 51 may be provided at a time subsequent to the events described within the flow chart 300. For example, after having previously recognized the merchandise item while shopping at a first merchant, the shopper may enter a new merchant storefront and identify the current location at 502 to correspond to the new merchant. While shopping within the new merchant, the shopper may view the same merchandise item through the wearable device 100 that was previously recognized and identified at the first merchant. An image of the merchandise item may be captured at 501 of the process described by flow chart 500. Then after analyzing the captured image at 503, and identifying the merchandise item at 504 based on the analysis of the captured image, the wearable device 100 may parse one or more memory components in order to determine whether the identified merchandise item was previously recognized. Because the merchandise item was in fact previously recognized, information corresponding to the merchandise item can be found within the memory components. By identifying such information from the memory components, the wearable device 100 may be able to determine that the merchandise item has previously been recognized and identified by the wearable device 100. It follows that a more detailed display, such as display 21, may be generated by the wearable device 100 in response to recognizing a merchandise item a subsequent time.

Display 51 is comprised of a location icon ('x') and a corresponding message. The location icon is superimposed over the recognized merchandise item. The corresponding message in display 51 may be generated at 506 to provide current promotional information pertaining to the merchandise item being offered by the merchant in which the shopper is currently located. For example, the corresponding message within display 51 recites, "We noticed you were recently browsing for item 1. You can find item 1 here at location 1." In this way, display 51 recognizes that the shopper previously recognized the merchandise item, and therefore presents a message informing the shopper that the same merchandise item is also currently available at the merchant in which the shopper is currently located.

The wearable device 100 may also identify another merchant within its field of view that also sells the same merchandise item as previously recognized. Display 52 exemplifies such a scenario where a second merchant is recognized within the field of view of the wearable device 100. The wearable device 100 may then run a merchant identification process to determine an identity of the second merchant. After determining the identity of the second merchant, the wearable device 100 may further determine whether the second merchant sells the same merchandise item as previously recognized at the first merchant and/or the current merchant. Because the merchandise item was previously recognized, there may exist information stored on a memory of the wearable device 100 that describes the merchandise item being sold at the first merchant and/or current merchant. It follows that a comparison may be made during the generation of the message at 506 that generates a message that includes information that compares the merchandise item as being sold at the second merchant versus the merchandise item as being sold by the first and/or current merchant. This is exemplified by display 52 that recites, "Item 1 can also be found at location 2 located x ft. further away for $x.xx, which is less than the price at location 1."

Going back to flow chart 500, if the merchandise item is determined not to have been previously recognized at 505, then at 508 a request may be transmitted to request an identity of a merchant that sells the merchandise item identified at 504. This request transmission may be similar, if not the same, as the request transmission provided at 305 in the process described by flow chart 300 herein.

Figures 1, 6:
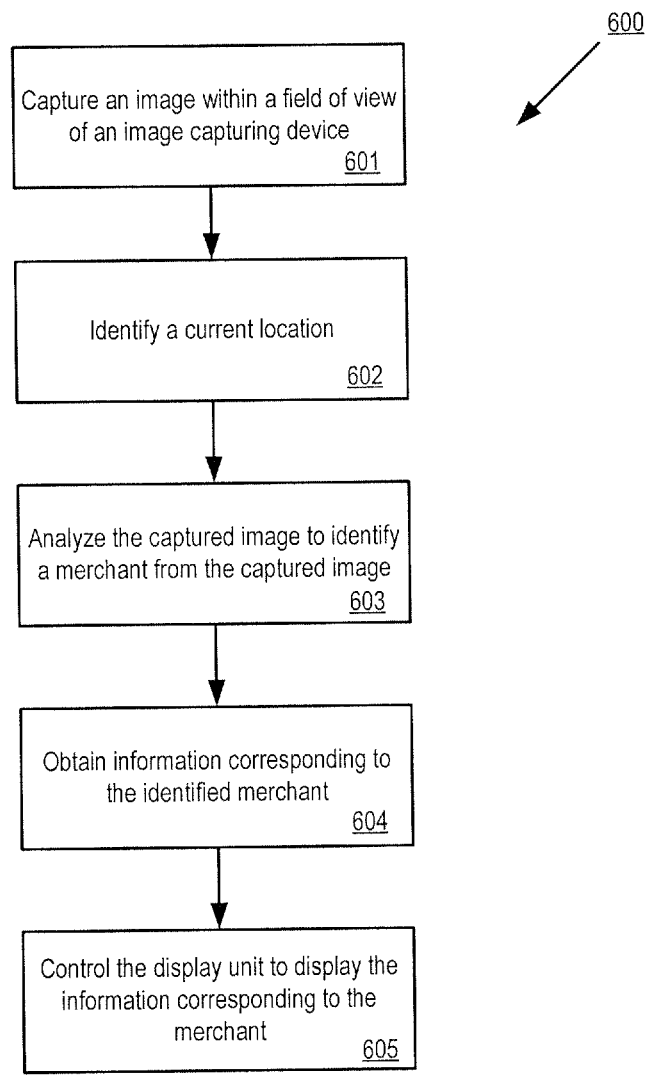
Figures 2, 6:
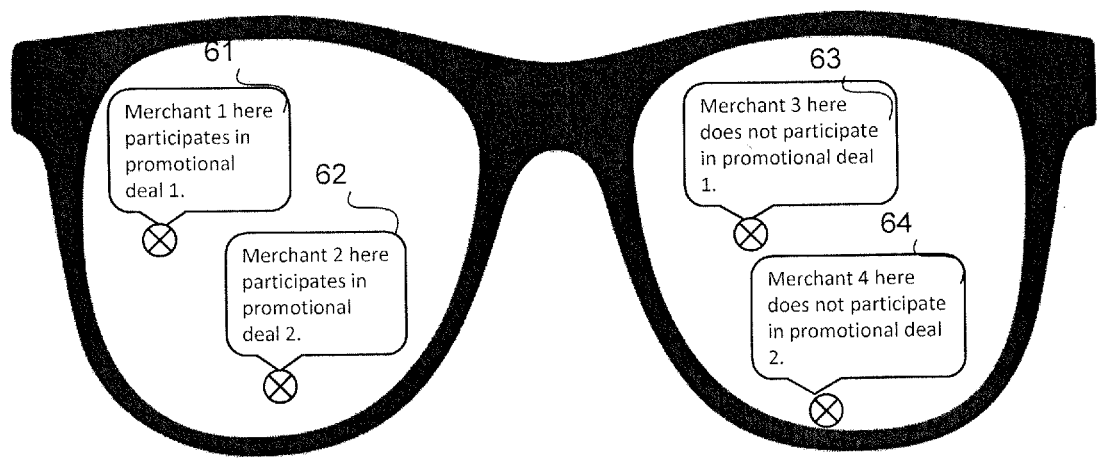

FIG. 6-1 illustrates an exemplary flow chart 600 describing a process that may be implemented by a shopping tool to assist a shopper in identifying a merchant within a field of view of the wearable device 100, obtaining information corresponding to the identified merchant, and then displaying the obtained information. The shopping tool may be, for example, a program running (such as a set of instructions stored on a memory and being executed by a processor) on the wearable device 100, remotely via the wearable device 100 from a remote server, or from both locations. FIG. 6-2 illustrates the wearable device 100 being utilized to run the shopping tool to implement the exemplary processes described by flow chart 600. It follows that the wearable device 100 illustrated in FIG. 6-2 may be referenced during the description of the process exemplified by flow chart 600 below.

At 601, an image within a field of view of the wearable device 100 may be captured. For example, FIG. 6-2 illustrates the wearable device 100 capturing an image of four separate merchants within the field of view of the wearable device 100. The captured image may be a still digital image, or part of a digital video such as a frame, or segment, from the digital video. The process for initiating the image capturing may correspond to any one or more of the processes described herein (for example, as described with reference to flow chart 300).

At 602, a current location of the wearable device 100 is identified by a location identifying component of the wearable device 100. For example, a location identifying component may be a GPS component as described, at least, elsewhere in this disclosure. The determination of the current location at 602 may include a determination of a current merchant in which the shopper wearing the wearable device 100 is presently located. In some embodiments the current location information may further be transmitted to an off-site server tasked with keeping track of the wearable device 100. For example, the off-site server may be the merchant server 250 or shopping server 260 as illustrated in FIG. 2-1.

At 603, the image captured at 601 is analyzed in order to recognize one or more merchants from the captured image. For example, FIG. 6-2 illustrates an exemplary field of view from the perspective of the wearable device 100 that recognizes four merchants (for example, merchants 1-4). Recognizing the merchants from the captured image at 603 may include an image recognition process where the wearable device 100 is able to analyze the captured image from 601 and recognize the name of the merchant included in the captured image based on the analysis. At the end of the process at 603, the identity of the merchant(s) included in the captured image may be obtained.

In addition or alternatively, recognizing the merchants at 603 may include an image recognition process where the wearable device 100 is able to analyze the captured image from 601, and in case the image does not include the characters that describe the merchant's name, the analysis may be able to determine the merchant's identity based on the look and/or dress of the merchant's storefront as recognized from the image. In such cases where the wearable device 100 analyzes the captured image in order to recognize the look and/or dress of the merchant's storefront, a number of suggested merchant identities may be generated by the wearable device 100 based on the analysis of the captured image. This list of suggested merchant identities may have been calculated by the wearable device 100 as a prediction for the real identify of the merchant(s) included in the captured image. The user may then select one or more merchant identities from the list of generated merchant suggestions.

Although the above description of the process at 603 above has been provided as being executed by the wearable device 100, it is within the scope of the shopping tool described herein that in some embodiments this process at 603 may be outsourced to an off-site server. For example, the off-site server may be the merchant server 250 or shopping server 260 as illustrated in FIG. 2-1. In such embodiments, the wearable device 100 may transmit a request for recognizing the merchants in the image captured at 601 to the off-site server, where the request includes at least the captured image. The off-site server may then execute any one or more of the recognition processes described above with respect to 603, and then transmit the resulting identification of merchants back to the wearable device 100.

After identifying the merchant at 603, at 604 the wearable device 100 may obtain information corresponding to the identified merchant. In some embodiments, the wearable device 100 may store information corresponding to merchants on one or more local memory components of the wearable device 100. In such embodiments, the information corresponding to the merchants may be updated periodically by receiving updates from off-site sources (for example, merchant servers) via network communications. For example, the off-site server may be the merchant server 250 or shopping server 260 as illustrated in FIG. 2-1. In other embodiments, the wearable device 100 may transmit an inquiry about the identified merchants to an off-site server that stores such information. Such an off-site server may be configured to receive the inquiry, analyze the identified merchants, and locate information corresponding to the identified merchants stored within its own memory component. The off-site server may store information that includes additional information corresponding to merchants that may be of interest to the shopper. For example, the off-site server may be updated with current promotional deals that are offered by merchants. The wearable device 100 may then obtain the information by receiving it from the off-site server.

Then at 605, the wearable device 100 may control a display unit 30 to display the information obtained at 604. For example, displays 61-64 exemplify merchants that may have been found within the field of view of the wearable device 100 according to the process described in flow chart 600.

Display 61 comprises a location identifier ('x') superimposed over merchant 1 and a message that includes information corresponding to the merchant 1. The message recites that, "Merchant 1 here participates in promotional deal L."

Display 62 comprises a location identifier ('x') superimposed over merchant 2 and a message that includes information corresponding to the merchant 2. The message recites that, "Merchant 2 here participates in promotional deal 2."

Display 63 comprises a location identifier ('x') superimposed over merchant 3 and a message that includes information corresponding to the merchant 3. The message recites that, "Merchant 3 here does not participate in promotional deal 1."

Display 64 comprises a location identifier ('x') superimposed over merchant 4 and a message that includes information corresponding to the merchant 4. The message recites that, "Merchant 4 here does not participate in promotional deal 1."

Figures 1, 7:
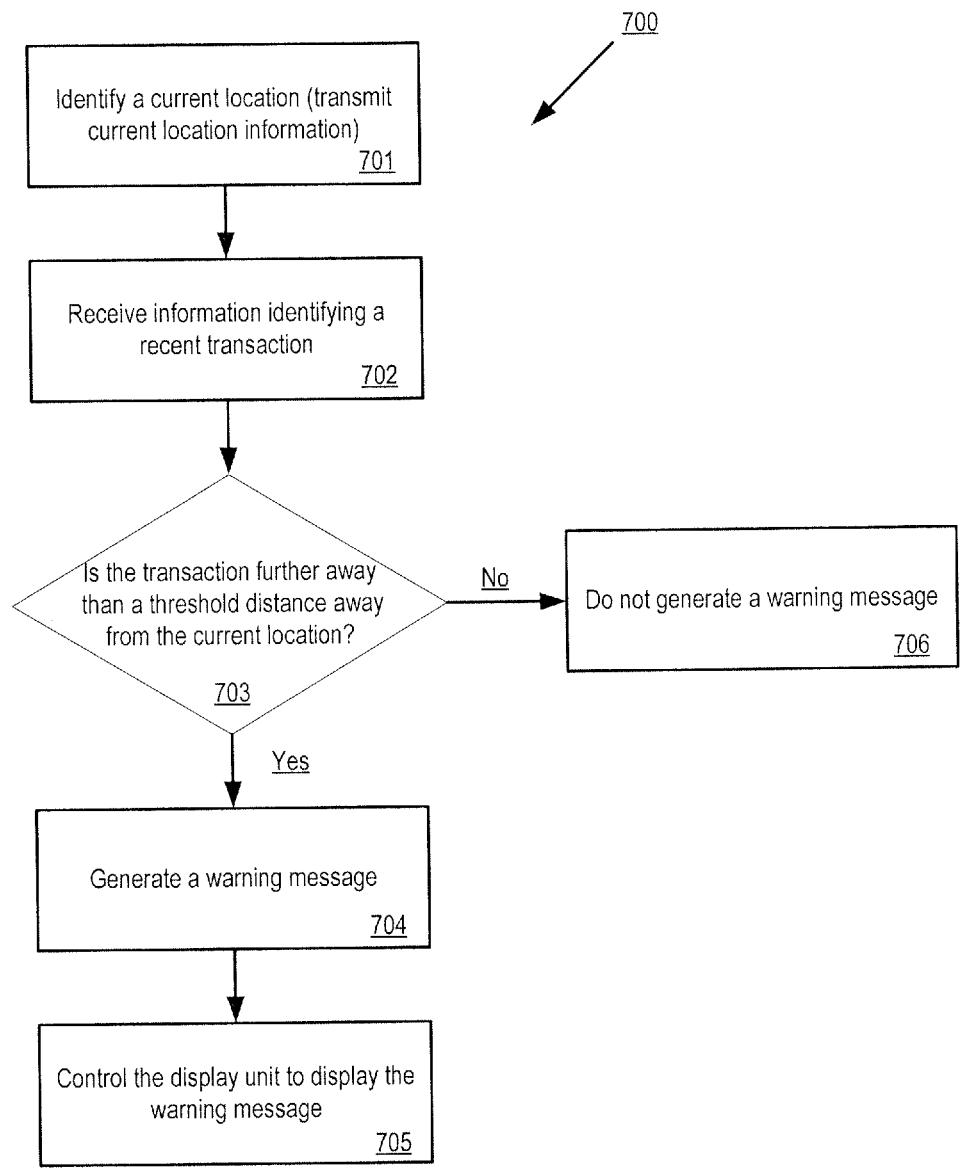
Figures 2, 7:
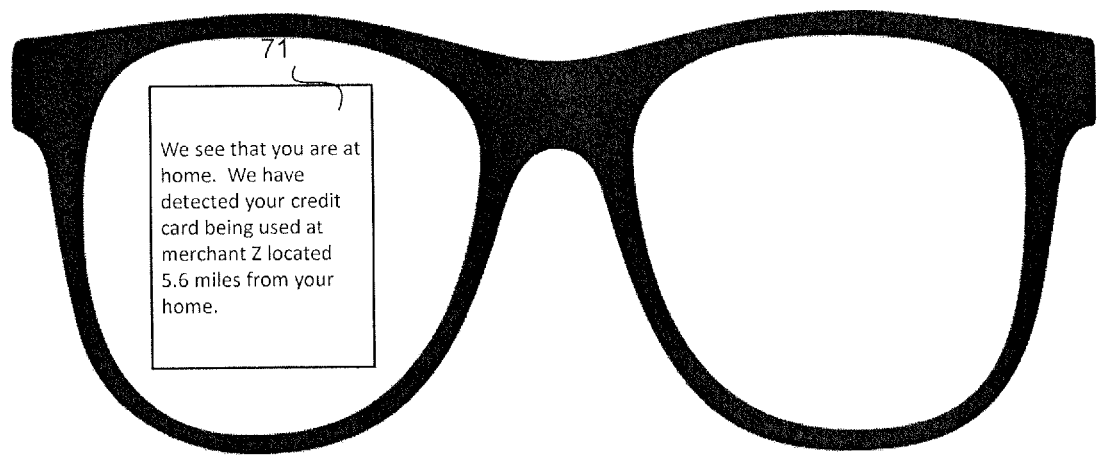

FIG. 7-1 illustrates an exemplary flow chart 700 describing a process that may be implemented by a shopping tool to alert a shopper on possibly fraudulent charges being made in the shopper's name. The shopping tool may be, for example, a program running (such as a set of instructions stored on a memory and being executed by a processor) on the wearable device 100, remotely via the wearable device 100 from a remote server, or from both locations. FIG. 7-2 illustrates the wearable device 100 being utilized to run the shopping tool that implements the exemplary processes described by flow chart 700. It follows that the wearable device 100 illustrated in FIG. 7-2 may be referenced during the description of the process exemplified by flow chart 700 below.

At 701, a current location of the wearable device 100 is identified by a location identifying component of the wearable device 100. For example, a location identifying component may be a GPS component as described, at least, elsewhere in this disclosure. In some embodiments the current location information may further be transmitted to an off-site server tasked with keeping track of the wearable device 100. For example, the off-site server may be the merchant server 250 or shopping server 260 as illustrated in FIG. 2-1.

In the meantime, an in-person transaction may be detected by a financial institution that identifies a financial account (for example, credit card, debit card, gift card, etc.) belonging to the shopper being involved in an in-person transaction. Information identifying the detection of the in-person transaction, as well as a location of the in-person transaction, may then be transmitted from the financial institution and received by the wearable device 100 owned by the shopper at 702.

At 703, a determination may be made whether the location of the in-person transaction is further away than a threshold distance away from the current location of the shopper (as identified from the location of the wearable device 100 identified at 701).

If the determination at 703 finds that the location of the recent transaction is not further away than the threshold distance, then a warning message is not generated at 706.

However, if the determination at 703 finds that the location of the recent transaction is further away than the threshold distance, then a warning message is generated at 704. This is because there is a high likelihood that the recent transaction involving the shopper's financial account was fraudulent. This is based on the shopper being located at the current location, while the transaction was detected at a location that is further away than the threshold distance away from the shopper's current location. The threshold distance may be a predetermined distance that is considered to be greater than a safe distance which does not trigger concerns of a fraudulent transaction.

At 705, the display unit 30 of the wearable device may be controlled to display the warning message generated at 704. For example, FIG. 7-2 illustrates an exemplary display that recites, "We see that you are at home. We have detected your credit card being used at merchant Z located 5.6 miles from your home."

Figures 1, 8:
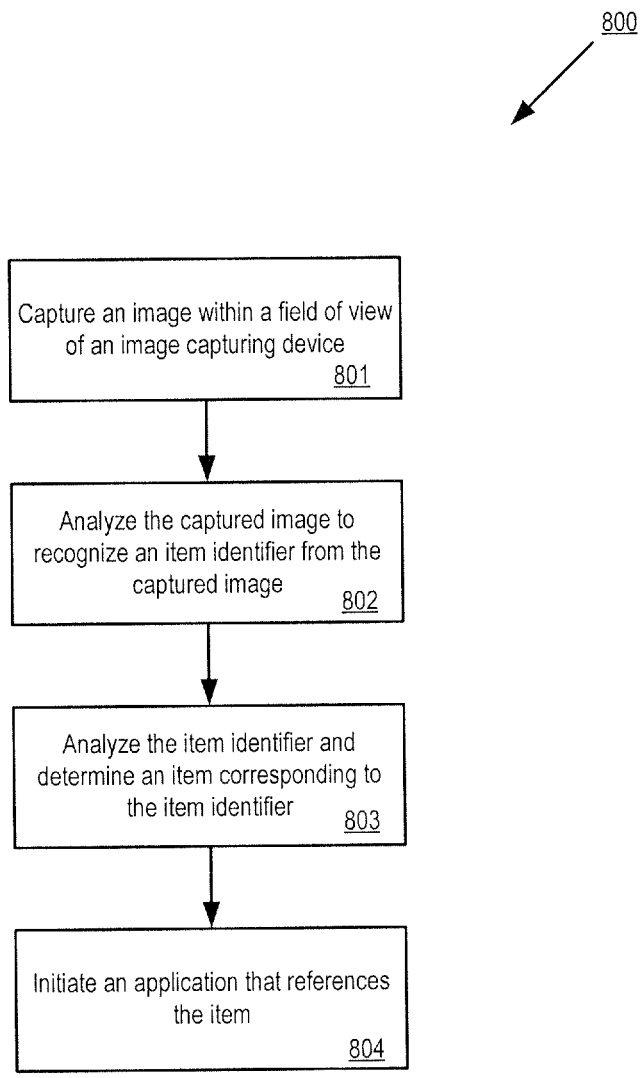
Figures 2, 8:
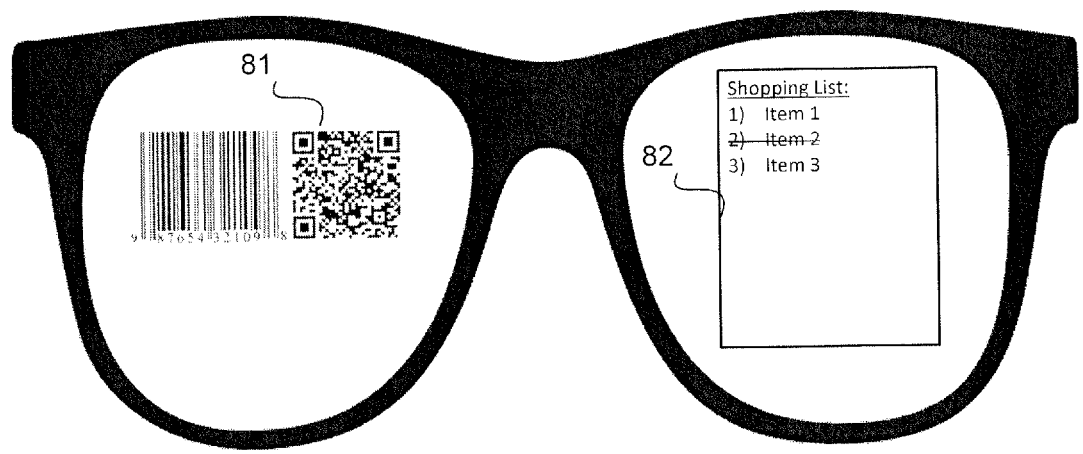
Figures 3, 8:
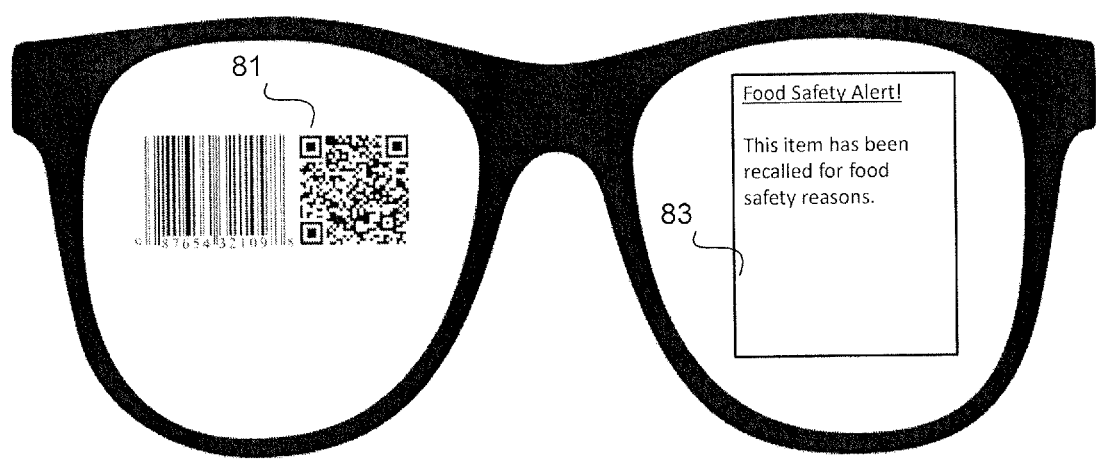
Figures 4, 8:
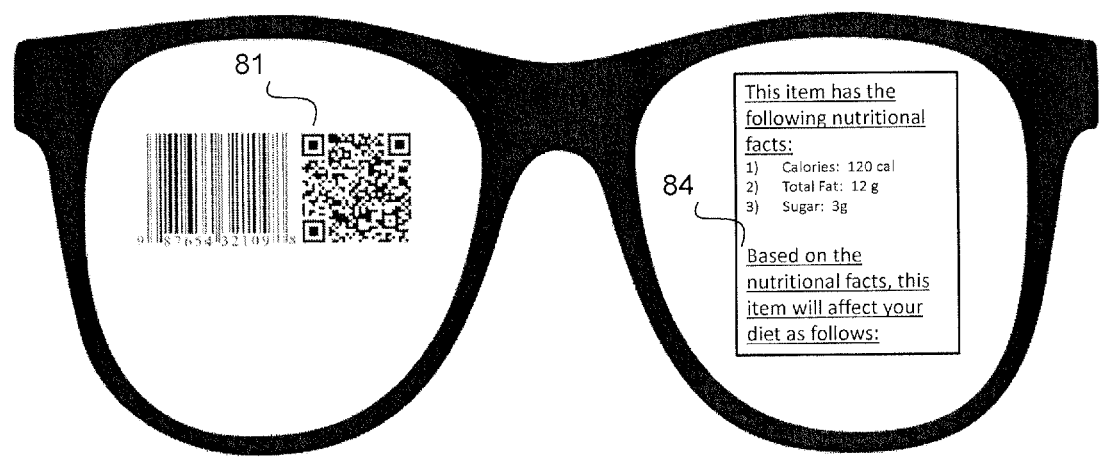
Figures 5, 8:
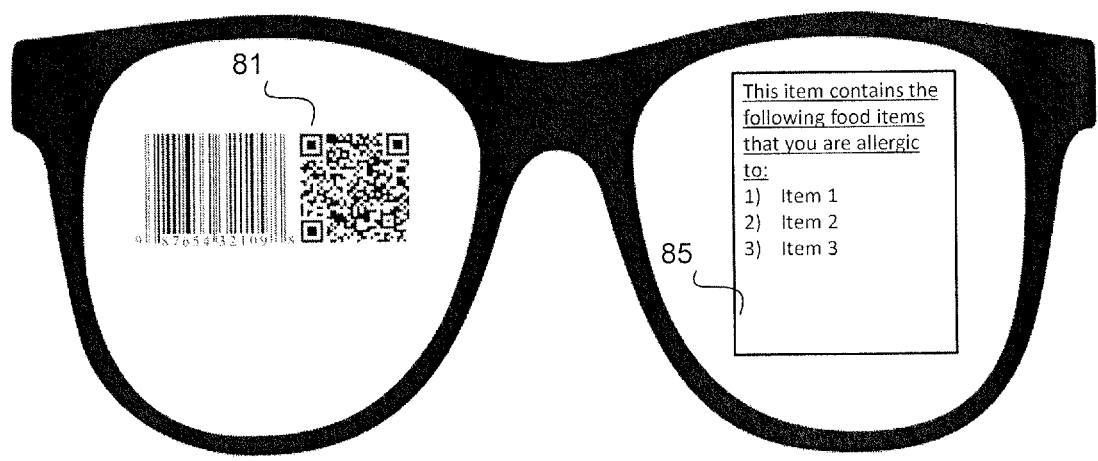
Figures 6, 8:
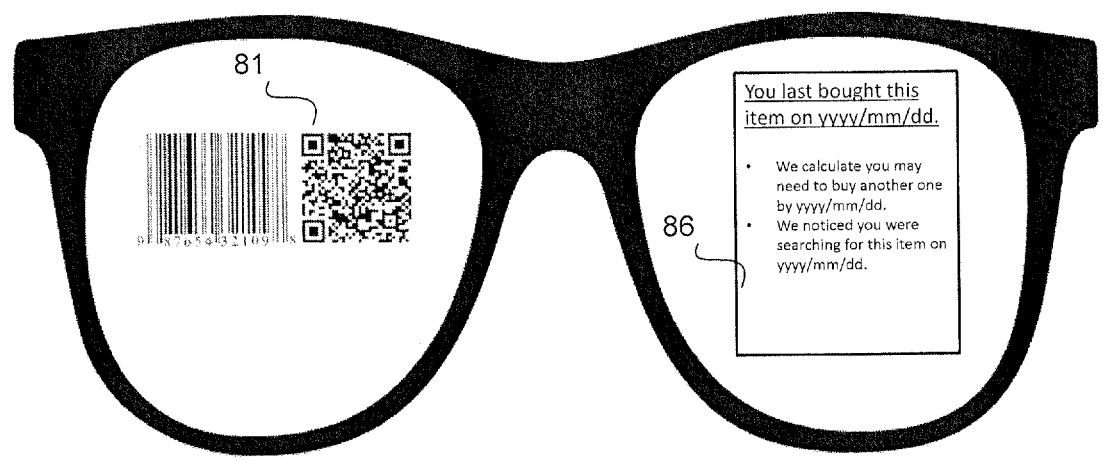
Figures 7, 8:
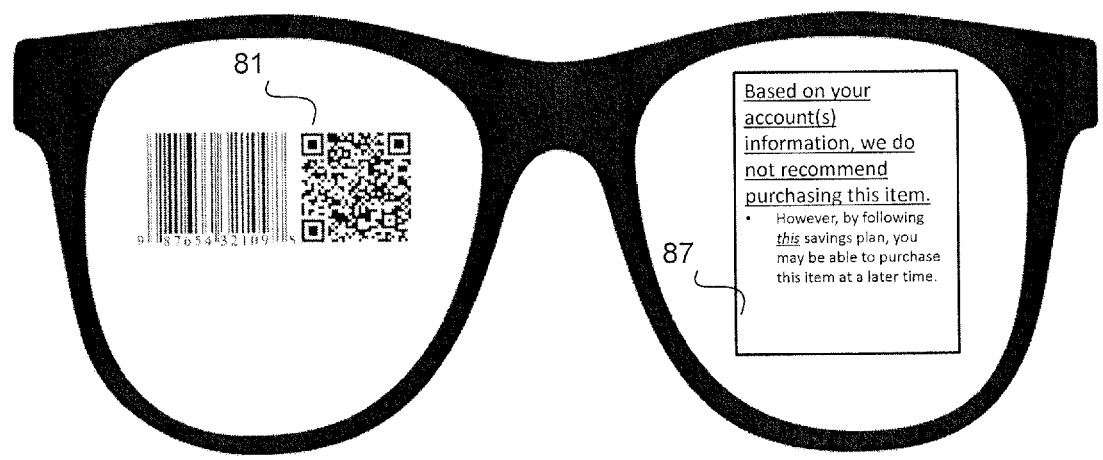

FIG. 8-1 illustrates an exemplary flow chart 800 describing a process that may be implemented by a shopping tool to assist a shopper during the execution of a shopping application. The shopping tool may be, for example, a program running (such as a set of instructions stored on a memory and being executed by a processor) on the wearable device 100. FIGS. 8-2 to 8-7 illustrate the wearable device 100 being utilized to run the shopping tool to implement various shopping applications in accordance to the exemplary processes described by flow chart 800. It follows that the wearable device 100 illustrated in FIGS. 8-2 to 8-7 may be referenced during the description of the process exemplified by flow chart 800 below.

At 801, an image within a field of view of the wearable device 100 may be captured. For example, FIGS. 8-2 to 8-7 illustrate the wearable device 100 capturing an image of a barcode and/or QR code 81 within the left-side field of view of the wearable device 100. The captured image may be a still digital image, or part of a digital video such as a frame, or segment, from the digital video. The process for initiating the image capturing may correspond to any one or more of the processes described herein (for example, as described with reference to flow chart 300).

At 802, the image captured at 801 is analyzed in order to recognize an item identifier from the captured image. For example, the item identifier may be a barcode and/or QR code 81 as illustrated in FIGS. 8-2 to 8-7. In addition or alternatively, the item identifier may be a recognizable title, label, or some other similar distinguishing characteristic of the merchandise item. The item identifier may be written on a packaging for the merchandise item, or may otherwise be located to correspond to the merchandise item.

At 803, the item identifier is analyzed in order to determine the merchandise item that corresponds to the item identifier. For example, in embodiments where the item identifier is a barcode, QR code, or some other easily identifiable type of item identifier, the item identifier may be referenced against a database of known item identifiers in order to determine the merchandise item that corresponds to the analyzed item identifier. In other embodiments where the item identifier is determined to be a recognizable title, label, or other type of item identifier that requires additional image recognition processing, the process at 803 may include an image recognition process for identifying the title, label or other type of item identifier in order to determine the corresponding merchandise item.

In addition to identifying the merchandise item that corresponds to the captured item identifier, additional information corresponding to the merchandise item may be identified at 803 following the identification of the merchandise item. For example, food safety alert information pertaining to the identified merchandise item may be obtained at 803 following the identification of the merchandise item. In addition, nutritional facts information pertaining to the identified merchandise item may be obtained at 803 following the identification of the merchandise item. In addition, ingredient information pertaining to the identified merchandise item may be obtained at 803 following the identification of the merchandise item. In addition, financial transaction information pertaining to the identified merchandise item and the shopper may be obtained at 803 following the identification of the merchandise item. In addition, pricing information of the merchandise item pertaining to the identified merchandise item may be obtained at 803 following the identification of the merchandise item.

At 804, an application is initiated that references the item. More specifically, the application initiated at 804 may reference information corresponding to the item identified at 803. For example, FIGS. 8-2 to 8-7 provide exemplary descriptions for applications that may be initiated at 804

FIG. 8-2 illustrates an exemplary wearable device 100 that is running a shopping list application in accordance. to the process described by flow chart 800. In the left-hand field of view, the wearable device 100 has identified an item identifier 81. This item identifier may have been analyzed according to a process such as described at 803, in order to determine a merchandise item corresponding to the item identifier 81. Based on this analysis at 803, the wearable device 100 may obtain information identifying the merchandise item. For example, the merchandise item may be a food product. The wearable device 100 may also be running the shopping list application. During the duration of the shopping list application running on the wearable device 100, the information identifying the merchandise item may obtain a shopping list 82 obtained by the wearable device 100 as part of the shopping list application. The shopping list 82 may then be displayed on the display unit 30 of the wearable device 100 as part of the shopping list application. If the merchandise item identified at 803 is recognized by the shopping list application as corresponding to a shopping list item in the shopping list 82 that is part of the shopping list application. In this case, the particular shopping list item may be crossed off from the shopping list 82, as illustrated in FIG. 8-2. This action of crossing off the shopping list item may be initiated by an input command input by the shopper into the wearable device 100.

FIG. 8-3 illustrates an exemplary wearable device 100 that is running a food safety application in accordance to the process described by flow chart 800. In the left-hand field of view, the wearable device 100 has identified an item identifier 81. This item identifier may have been analyzed according to a process such as described at 803, in order to determine a merchandise item corresponding to the item identifier 81. Based on this analysis at 803, the wearable device 100 may obtain information identifying the merchandise item. The merchandise item may be, for example, a food product. The wearable device 100 may also be running the food safety application. During the duration of the food safety application running on the wearable device 100, the wearable device 100 may be obtaining food safety alert information on one or more food products that may include the merchandise item identified at 803. If a match is found between the merchandise item identified at 803 and a food safety alert, the food safety application may display an alert message on the display unit 30 of the wearable device 100. For example, FIG. 8-3 illustrates an alert message 83 that recites, "This item has been recalled for food safety reasons."

FIG. 8-4 illustrates an exemplary wearable device 100 that is running a nutritional facts application in accordance to the process described by flow chart 800. In the left-hand field of view, the wearable device 100 has identified an item identifier 81. This item identifier may have been analyzed according to a process such as described at 803, in order to determine a merchandise item corresponding to the item identifier 81. Based on this analysis at 803, the wearable device 100 may obtain information identifying the merchandise item as well as additional information identifying nutritional facts on the merchandise item in case the merchandise item is a food product. The wearable device 100 may also be running the nutritional facts application. During the duration of the nutritional facts application running on the wearable device 100, the wearable device 100 may be obtaining nutritional facts information on one or more food products that may include the merchandise item identified at 803. When the merchandise item is identified at 803 as a food product, the nutritional facts application may obtain nutritional fact information corresponding to the merchandise item. After obtaining nutritional fact information on the merchandise item, the nutritional facts application may control the display unit 30 of the wearable device 100 to display the obtained nutritional facts as illustrated in FIG. 8-4. For example, FIG. 8-4 illustrates the nutritional fact information for the merchandise item (for example, food product) identified from the item identifier 81 within the field of view of the wearable device 100.

FIG. 8-5 illustrates an exemplary wearable device 100 that is running a food allergen application in accordance to the process described by flow chart 800. In the left-hand field of view, the wearable device 100 has identified an item identifier 81. This item identifier may have been analyzed according to a process such as described at 803, in order to determine a merchandise item corresponding to the item identifier 81. Based on this analysis at 803, the wearable device 100 may obtain information identifying the merchandise item as well as ingredient information for the merchandise item in case the merchandise item is a food product. The wearable device 100 may also be running the food allergen application. During the duration of the food allergen application running on the wearable device 100, the wearable device 100 may be obtaining information on food product type of items identified at 803 and comparing them to a database of known allergens to the shopper identified in the food allergen application. If a match is found between the food product item identified at 803 and a known food allergen of the shopper, a warning 85 may be displayed on the display unit 30 of the wearable device 100. For example, FIG. 8-5 illustrates a warning message 85 that lists a number of food product items that have been found by the food allergen application to have been identified via the item identifier 81 recognized from the field of view of the wearable device 100.

FIG. 8-6 illustrates an exemplary wearable device 100 that is running a financial analysis application in accordance to the process described by flow chart 800. In the left-hand field of view, the wearable device 100 has identified an item identifier 81. This item identifier may have been analyzed according to a process such as described at 803, in order to determine a merchandise item corresponding to the item identifier 81. Based on this analysis at 803, the wearable device 100 may obtain information identifying the merchandise item as well as pricing information of the merchandise item. The wearable device 100 may also be running the financial analysis application. During the duration of the financial analysis application running on the wearable device 100, the wearable device 100 may be obtaining financial transaction information pertaining to a transaction history of purchases made by the shopper. If the merchandise item identified at 803 is found within the transaction history pertaining to the shopper, the financial analysis application may generate a message to the shopper advising when the shopper should buy the merchandise item again. This advice message may be based on a detected pattern for time intervals in which the particular merchandise item is found to be bought on average for consumers generally (for example, average time between buying toilet paper), or may be more specifically based on a detected pattern for time intervals in which the shopper is found to buy the particular merchandise item based on an analysis of the shopper's transaction history. The advice message 86 may be displayed on the display unit 30 of the wearable device 100. For example, FIG. 8-6 illustrates an advice message 86 that advises the shopper when the merchandise item recognized from the item identifier 81 found in the field of view of the wearable device 100 was last bought, as well as a predicted date when the shopper should re-stock the merchandise item. The advice message may also optionally include a message identifying a last time the shopper was searching for this information. In order to include this optional message, the financial analysis application will need to obtain, for example, an internet browsing history for the shopper to see when the shopper last searched for the merchandise item on the internet.

FIG. 8-7 illustrates an exemplary wearable device 100 that is running a financial analysis application in accordance to the process described by flow chart 800. In the left-hand field of view, the wearable device 100 has identified an item identifier 81. This item identifier may have been analyzed according to a process such as described at 803, in order to determine a merchandise item corresponding to the item identifier 81. Based on this analysis at 803, the wearable device 100 may obtain information identifying the merchandise item as well as pricing information of the merchandise item. The wearable device 100 may also be running the financial analysis application. During the duration of the financial analysis application running on the wearable device 100, the wearable device 100 may be obtaining financial information pertaining to the shopper. The financial information may include the shopper's financial transaction history and financial accounts information. Based on this obtained financial information pertaining to the shopper, the financial analysis application may make a determination on whether the shopper should purchase the merchandise item identified from the item identifier 81 recognized from within the field of view of the wearable device 100. Based on this determination, an advice message 87 may be generated. This advice message may be based on a determination of whether the shopper can afford to purchase the merchandise item in terms of, for example, financial savings goals assigned to the shopper, or more generally the financial health of the shopper as determined by the financial analysis application. The advice message 87 may be displayed on the display unit 30 of the wearable device 100. For example, FIG. 8-7 illustrates an advice message 87 that advises the shopper not to purchase the merchandise item. Optionally, the advice message may be generated by the financial analysis application to include advice on how the shopper may purchase the merchandise item without risking the financial security of the shopper. For example, the advice message 87 illustrated in FIG. 8-7 includes advice to the shopper to follow a particular savings plan that has been generated by the financial analysis application.

Figures 1, 9:
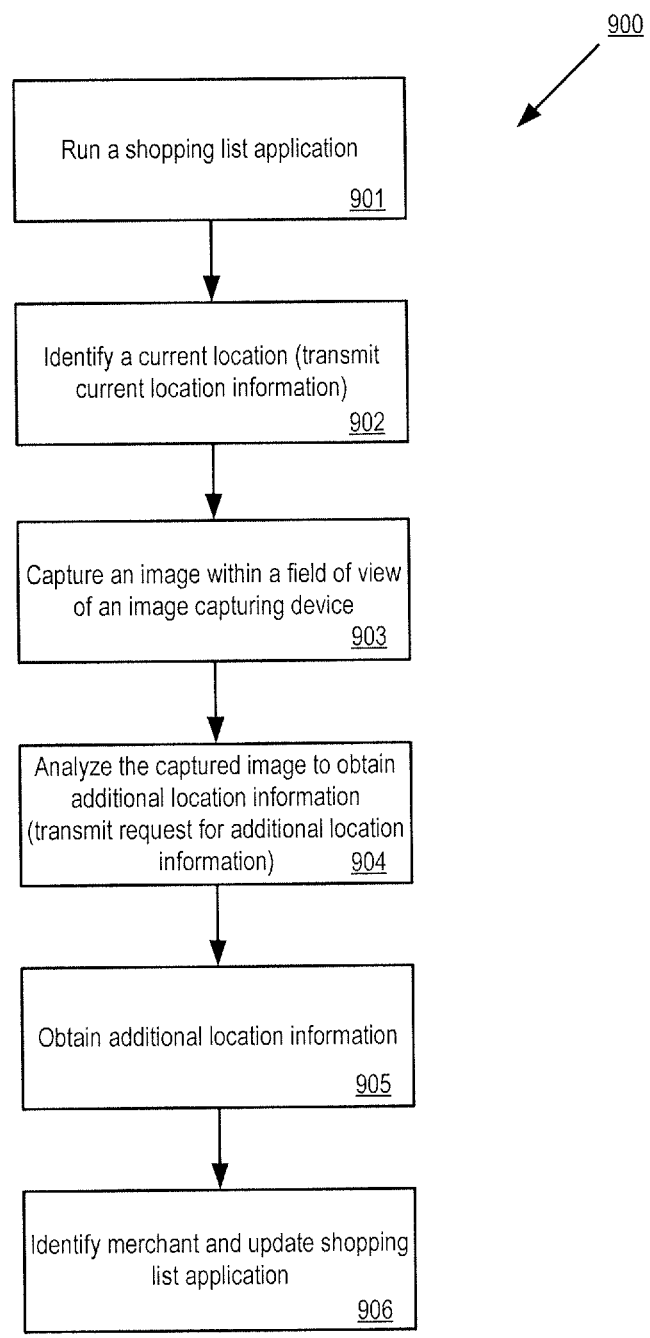
Figures 2, 9:
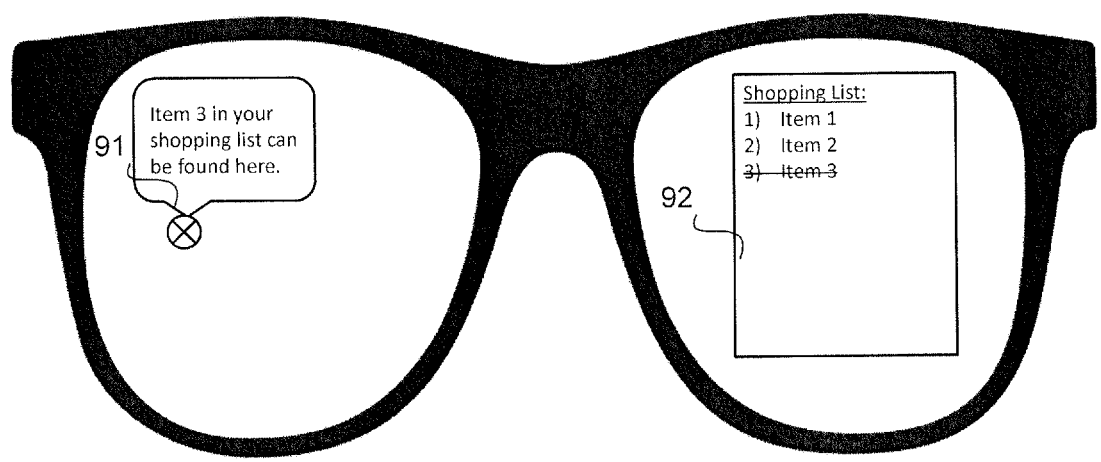

FIG. 9-1 illustrates an exemplary flow chart 900 describing a process that may be implemented by a shopping tool to assist a shopper running a shopping list application on the wearable device 100. The shopping tool may be, for example, a program running (such as a set of instructions stored on a memory and being executed by a processor) on the wearable device 100, remotely via the wearable device 100 from a remote server, or from both locations. FIG. 9-2 illustrates the wearable device 100 being utilized to implement the process described by the exemplary flow chart 900. It follows that the wearable device 100 illustrated in FIG. 9-2 may be referenced during the description of the process exemplified by flow chart 900 below.

At 901, a shopping list application may be running on the wearable device 100. The shopping list application may reference a shopping list previously prepared by the shopper and stored on a memory of the wearable device or on the shopping server 260. The shopping list may include information identifying items (for example, merchandise items, food items, etc.) input by the shopper. In additionally, the shopping list may be a preloaded shopping list included as part of the shopping list application. For example, the shopping list application may include preloaded shopping lists that include the ingredients needed for specific food dish recipes. The shopping list application may also include preloaded shopping lists that include the items needed for a specific building project (for example, items needed to install kitchen backsplash). In some embodiments, the preloaded shopping lists may be revised by the shopper. Also, it should be noted that in some embodiments the shopping list may be stored on an off-site server such that the shopping list application running on the wearable device 100 may transmit a request for the shopping list to the off-site server in order to retrieve the shopping list for use in the shopping list application. The off-site server may, for example, correspond to the merchant server 250 or shopping server 260 as illustrated within the system described in FIG. 2-1.

In order to generate the shopping list, a shopper may have entered a desired list from a computing device the shopper has (such as home PC, tablet or portable computing device) and uploaded it to the shopping server 260. The current status of what the shopper needs may then be determined by the shopper using the wearable device 100 to scan the shopper's refrigerator and/or cabinets to automatically check what needs to be purchased and what already exists in the shopper's home in sufficient quantities. The labels and descriptions of the items in the shopper's home may be analyzed with an OCR or other recognition software, or the barcode or QR code information can be analyzed, and then compared to the complete list that the shopper maintains locally or in the shopping server 260. The items not scanned by the wearable device 100, but present on the master shopping list, may then be placed on the current shopping list. Alternatively, the shopping list may be manually input from a computing device of the shopper and uploaded into the wearable device directly, or via the shopping server, without any comparison to a master shopping list. Similarly, a shopping list may be automatically generated at the shopper's home computer or the shopping server based on a recipe and the totality of the ingredients placed in a shopping list, or just those missing items not currently scanned at the shopper's home may be placed on the shopping list.

At 902, a current location of the wearable device 100 is identified by a location identifying component of the wearable device 100. For example, a location identifying component may be a GPS/IPS component 229 as described, at least, elsewhere in this disclosure. This information may be referenced to determine a current merchant storefront in which the shopper (wearable device) is located. In addition, based on obtaining the identity of the current merchant storefront in which the shopper is located, the shopping list application may further obtain layout information describing the mapping layout of the current merchant storefront. This layout information may be stored within a memory of the wearable device 100. By comparing at least the current location information and the layout information, the shopping list application may determine the location of the shopper within the current merchant storefront.

In one embodiment, a shopping server 260 or merchant server 250 may learn (or fine tune) the internal layout of a particular store by monitoring where shoppers with a wearable device 100 scan in different items. Once the internal layout of the store is learned, or revised, based on this data, the shoppers may be able to access general maps of where items are located in the store and the shopping list may be automatically reordered for each particular shopper based on which items are currently closest to the shopper.

In some embodiments the current location information may be transmitted to an off-site server tasked with keeping track of the wearable device 100. The off-site server may, for example, correspond to the merchant server 250 or shopping server 260 as illustrated within the system described in FIG. 2-1. The current location information may also be transmitted with information identifying a merchant storefront in which the shopper (the wearable device 100) is currently located in. Alternatively, the off-site server may determine the merchant storefront in which the shopper is currently located based on the received current location information. The merchant storefront information (for example, identity of the merchant, layout of the merchant storefront) may then be transmitted back to the wearable device 100. By comparing at least the current location information and the layout information, the shopping list application may determine the location of the shopper within the current merchant storefront.

At 903, an image within a field of view of the wearable device 100 may be captured. For example, FIG. 9-2 illustrates the wearable device 100 capturing an image of a merchant that is within the field of view of the wearable device 100. The captured image may be a still digital image, or part of a digital video such as a frame, or segment, from the digital video. The process for initiating the image capturing may correspond to any one or more of the processes described herein (for example, as described with reference to flow chart 300).

At 904, the image captured at 903 may be analyzed to further specify a location of the shopper (the wearable device 100) within the merchant storefront. For example, FIG. 9-2 illustrates an exemplary field of view from the perspective of the wearable device 100 that recognizes a specific location within the merchant storefront where a particular item is located. The analysis at 904 may be implemented to detect specific icons, markers, landmarks, signs, barcodes, QR codes, or other similar identification markers that would allow the shopping list application to further pinpoint the location of the shopper. Based on this more precise location information, the shopping list application may obtain additional information. For example, the shopping list application may obtain additional information identifying a location within the field of view of the wearable device 100 where a particular item in the shopping list is located, as illustrated in FIG. 9-2.

In some embodiments, the analysis at 904 may be accomplished by the wearable device 100 transmitting the captured image to an off-site server for analysis. For example, the off-site server may be the merchant server 250 or shopping server 260 as illustrated in FIG. 2-1. The off-site server may receive the captured image, analyze the captured image as described above, and then transmit the obtained additional information back to the wearable device 100.

At 905, the additional information is obtained by the wearable device 100 according to any one or more of the processes described above with reference to 904.

At 906, the wearable device 100 may reference the additional information to identify a location of an item from the shopping list. This is illustrated by FIG. 9-2. FIG. 9-2 illustrates a shopping list 92 that includes three shopping list items: item 1, item 2, and item 3. FIG. 9-2 also illustrates the wearable device 100 displaying display 91, where display 91 is comprised of a location identifier ('x') and a message. The location identifier is superimposed over the location of item 3 within the merchant storefront. The message identifies item 3 from the shopping list by reciting, "Item 3 in your shopping list can be found here." By locating item 3 according to the process described by flow chart 900, the shopping list application may display the display 91 and also update the shopping list to cross off the located item 3.

Figure 10:
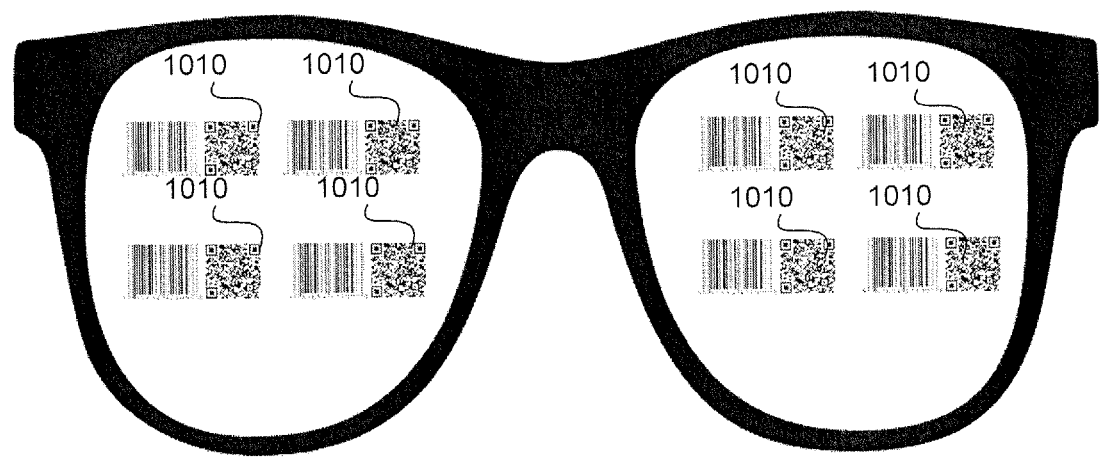
FIG. 10 illustrates an exemplary viewpoint of a wearable device.

FIG. 10 illustrates an exemplary field of view of the wearable device 100 that includes a plurality of item identifiers 1010 (for example, barcode, QR codes). It is within the scope of the wearable device 100 described herein to be capable of capturing an image of the one or more item identifiers 1010 within its field of view as part of the features available from a shopping tool running (such as a set of instructions stored on a memory and being executed by a processor) on the wearable device 100, remotely via the wearable device 100 from a remote server, or from both locations. The captured image may be a still digital image, or part of a digital video such as a frame, or segment, from the digital video. The process for initiating the image capturing may correspond to any one or more of the processes described herein (for example, as described with reference to flow chart 300).

After capturing the one or more item identifiers 1010 within its field of view, the wearable device 100 may further analyze the item identifiers 1010 to obtain information on the item corresponding to the item identifiers. This analysis may be implemented in accordance to any one or more of the processes described throughout this disclosure.

For example, two or more objects within the field of view of the wearable device 100 (for example, the item identifiers or merchandise items) may be compared according to a gesture command recognized by the shopping tool analyzing images captured from within the field of view of the wearable device 100. The gesture command may correspond to the shopper pointing to a first object (for example, a first item identifier) within the field of view with a first digit (for example, finger or other pointed object), and then pointing to a second object (for example, a second item identifier) within the field of view with a second digit (for example, finger or other pointed object). The two digits (for example, fingers on a same hand, or different hands) may be recognized by the shopping tool as a gesture command to capture an image or begin video recording by the image capturing device of the wearable device 100. The image capturing device may further be configured to capture an image within a specified radius, box, or other area within relation to a proximity to the recognized digit. For example, the image capturing device may focus on capturing an image within a specified radius, box, or other area within relation to a tip of the shopper's finger as recognized from the field of view. After capturing the image of the two or more objects, the shopping tool may analyze the image in order to recognize the two objects. After recognizing the two or more objects, the shopping tool may obtain information corresponding to the two objects from a database stored on a memory of the wearable device 100. In addition or alternatively, the shopping tool may transmit a request to an off-site server to obtain information corresponding to the two objects recognized from the captured image. For example, the off-site server may be the merchant server 250 or shopping server 260 as illustrated in FIG. 2-1. It follows that after receiving the information on the two objects, the shopping tool may compare the information on the two objects and provide an analysis to the shopper by, for example, displaying the results of the comparison analysis on the display 30 of the wearable device 100. This comparison feature available via the gesture command may be utilized within the context of any one or more of the processes described herein. For example, the two objects may correspond to two similar merchandise items that need to be bought as part of a shopping list (for example, shopping list described herein). The two digit comparison gesture command may then allow the shopper to point to both of the merchandise items to initiate the process described above for comparing the two merchandise items. After comparing the merchandise items, the shopper may then input a command to select one of the merchandise items, thus taking off the one item from the shopping list based on the selection. The shopper's command may be entered in any of a number of ways into the wearable device (such as the wearable eye wear discussed above) including by touch, winking, long wink, wink with both eyes, double blink, or nodding the head.

According to another example, in some embodiments the wearable device 100 may detect a current location of the wearable device 100 according to any one or more of the processes described herein, for example via an, indoor positioning system (IPS), global positioning system (GPS) or combination of both. Based on the location detection, the wearable device 100 may determine a current merchant in which the wearable device is located. The user of the wearable device may order their shopping list based on their current location and the distance they are from that item and display the list or item to the wearer. For example, all produce items will show up next in the shopping list when in the produce section of the store. Alternatively, the wearable device 100 may obtain information on the current merchant by communicating with a device (for example, via Near Frequency Communication, Bluetooth, or other similar standard) corresponding to the current merchant, such that coming within a vicinity of the device will inform the wearable device 100 the identity of the current merchant. This device may, for example, be the current merchant's server 250 as illustrated in the system of FIG. 2-1. This device may also be, for example, a transmitting/receiving device 240 corresponding to the current merchant as illustrated in the system of FIG. 2-1. In any case, after obtaining the identity of the current merchant in which the wearable device 100 is located, the wearable device may utilize a shopping tool that allows the wearable device 100 to communicate with a server corresponding to the current merchant in order to obtain permission from the current merchant to allow the shopping tool to check out items that are recognized from the item identifiers as described above. Checking out the merchandise item may include allowing for the purchase of the merchandise item by a financial account linked to the shopping tool.

Figure 11:
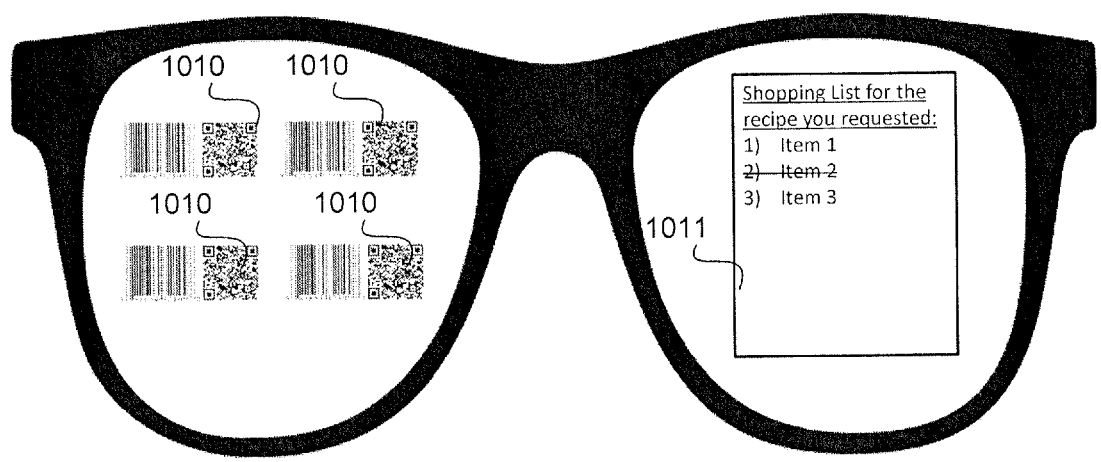
FIG. 11 illustrates an exemplary viewpoint and display of a wearable device.

In addition or alternatively, checking out the merchandise item may also include checking the merchandise item off a shopping list managed and stored by the shopping tool. For example, FIG. 11 illustrates one or more item identifiers 1010 detected within a field of view of the wearable device 100. FIG. 11 also illustrates the shopping tool operating to manage a shopping list 1011. Of the four item identifiers 1010 detected in the field of view of the wearable device 100, FIG. 11 illustrates a scenario where an analysis of the four item identifiers 1010 has determined that one of the item identifiers 1010 corresponds to item 2 which is included in the shopping list 1011. Based on the identification of item 2 from the analysis of the detected item identifiers 1010, the shopping list application running on the wearable device may then reference this information to cross out item 2.

In addition or alternatively, the shopping tool running on the wearable device 100 may output an audio response describing the information on the item corresponding to the item identifiers. This feature of the shopping tool may be beneficial to sight impaired shoppers that may not be able to clearly read information displayed on the display unit 30 of the wearable device 100. This audio response feature is also applicable to any of the information identified as described throughout this disclosure.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

For example, although the wearable device 100 is describe in FIG. 1 as including a single display unit 30, other descriptions of the wearable device 100 have been provided in this disclosure that describe the wearable device as being capable of displaying in both left and right fields of view. It follows that the display unit 30 illustrated in FIG. 1 may be a representation of a display unit that covers both fields of view of the wearable device 100.

Although the processes described by flow charts 300-900 are provided in a particular order, it is within the scope of the innovation described herein to have one or more of the processes implemented in another order.

Although this disclosure describes merchants offering merchandise items, the items may by physical items, or services offered by the merchant.

What is claimed is:

1. A wearable electronic device, comprising:
    an image capturing device configured to capture at least one image within a field of view of the image capturing device in response to an input from a wearer of the wearable electronic device;
    a positioning system configured to identify a location of the electronic device;
    a display unit configured to display; and
    a controller, in communication with the image capturing device, positioning system and display unit, and configured to:
        recognize one or more merchants that are within the field of view of the image capturing device;
        obtain internet browsing information corresponding to a user of the wearable electronic device;
        identify a purchasable item that the user has searched for within the user's internet browsing information;
        identify a target merchant from one or more merchants recognized from the field of view that offer the purchasable item identified within the user's internet browsing information; and
        control, after recognition of a gesture command, the display unit to superimpose information identifying the target merchant as offering the purchasable item identified within the user's internet browsing information;
    wherein the controller is further configured to:
        automatically analyze the at least one captured image and recognize an item identifier from the at least one captured image based on the analysis;
        obtain information corresponding to an item represented by the item identifier;
        obtain merchant information identifying a merchant that offers the same item, the merchant being located at a different location within a specified distance from the location of the wearable electronic device;
        automatically analyze the at least one captured image and recognize, based on the analysis, that the merchant that offers the same item has a location within the field of view of the wearable electronic device; and
        control the display unit to display, to the wearer of the wearable electronic device:
            a location icon superimposed on the location within the field of view of the wearable electronic device, and
            in association with the location icon, the merchant information identifying the merchant that offers the same item;
        wherein the item identifier is one of a barcode, QR code, recognized item shape, or recognized item name.

2. The wearable electronic device of claim 1, wherein the controller is configured to obtain the information corresponding to the item represented by the item identifier by:
    transmitting a request for identifying an item corresponding to the item identifier; and
    receiving information identifying the item in response to the request.

3. The wearable electronic device of claim 1, wherein the controller is further configured to:
    receive price information for the item at a first merchant corresponding to the location of the electronic device, wherein the first merchant is different from the merchant located within the specified distance;
    receive price information for the item being sold at the merchant located within the specified distance, and
    control the display unit to display the price information for the item at the first merchant and display the price information for the item at the merchant located within the specified distance.

4. The wearable electronic device of claim 3, wherein the controller is further configured to:
    compare the price information for the item at the first merchant and the merchant located within the specified distance, and
    control the display unit to display the price information for the item in an order from cheapest to most expensive, based on the comparison.

5. The wearable electronic device of claim 3, wherein the controller is further configured to:
    control the display unit to display the information identifying the item being sold at the merchant, located within the specified distance, by overlaying the price information for the item to correspond to the merchant located within the specified distance and within the field of view of the image capturing device.

6. The wearable electronic device of claim 1, wherein the controller is further configured to:

recognize one or more merchants that are within the field of view of the image capturing device;

obtain promotional deal information from the one or more merchants, and control the display unit to superimpose the promotional deal information to identify the one or more merchants that are within the field of view of the image capturing device.

7. The wearable electronic device of claim 1, wherein the controller is further configured to:

obtain alert information identifying a transaction corresponding to a financial account of a user of the wearable electronic device has occurred outside a predetermined distance from the location of the wearable electronic device, and control the display unit to display the alert information.

8. The wearable electronic device of claim 1, wherein the controller is further configured to control the display unit to display, to the wearer of the wearable electronic device, and superimposed on a map, the location icon and the merchant information identifying the merchant that offers the same item.

9. A wearable electronic device comprising:

a controller configured to:

receive at least one image captured by an image capturing device;

automatically analyze the at least one captured image;

recognize one or more merchants that are within a field of view of the image capturing device;

obtain internet browsing information corresponding to a user of the wearable electronic device;

identify a purchasable item that the user has searched for within the user's internet browsing information;

identify a target merchant from the one or more merchants recognized from the field of view that offer the purchasable item identified within the user's internet browsing information; and control, after recognition of a gesture command, a display unit to superimpose information identifying the target merchant as offering the purchasable item identified within the user's internet browsing information;

wherein the controller is further configured to:

recognize an item identifier from the at least one captured image based on the analysis;

obtain information corresponding to an item represented by the item identifier;

receive a location of the wearable electronic device identified by a positioning system;

obtain merchant information identifying a merchant that offers the same item, the merchant being located at a different location within a specified distance from the location of the wearable electronic device;

automatically analyze the at least one captured image and recognize, based on the analysis, that the merchant that offers the same item has a location within the field of view of the wearable electronic device; and control the display unit to display, to the wearer of the wearable electronic device:

a location icon superimposed on the location within the field of view of the wearable electronic device, and in association with the location icon, the merchant information identifying the merchant that offers the same item;

wherein the item identifier is one of a barcode, QR code, recognized item shape, or recognized item name.

10. The wearable electronic device of claim 9, wherein the controller is configured to obtain the information corresponding to the item represented by the item identifier by:

transmitting a request for identifying an item corresponding to the item identifier; and receiving information identifying the item in response to the request.

11. The wearable electronic device of claim 9, wherein the controller is further configured to:

receive price information for the item at a first merchant corresponding to the location of the electronic device, wherein the first merchant is different from the merchant located within the specified distance;

receive price information for the item being sold at the merchant located within the specified distance, and control the display unit to display the price information for the item at the first merchant and display the price information for the item at the merchant located within the specified distance.

12. The wearable electronic device of claim 11, wherein the controller is further configured to:

compare the price information for the item at the first merchant and the merchant located within the specified distance, and control the display unit to display the price information for the item in an order from cheapest to most expensive, based on the comparison.

13. The wearable electronic device of claim 11, wherein the controller is further configured to:

control the display unit to display the information identifying the item being sold at the merchant, located within the specified distance, by overlaying the price information for the item to correspond to the merchant located within the specified distance and within the field of view of the image capturing device.

14. The wearable electronic device of claim 9, wherein the controller is further configured to:

recognize one or more merchants that are within the field of view of the image capturing device;

obtain promotional deal information from the one or more merchants, and control the display unit to superimpose the promotional deal information to identify the one or more merchants that are within the field of view of the image capturing device.

15. The wearable electronic device of claim 9, wherein the controller is further configured to:

obtain alert information identifying a transaction corresponding to a financial account of a user of the wearable electronic device has occurred outside a predetermined distance from the location of the wearable electronic device, and control the display unit to display the alert information.

16. The wearable electronic device of claim 9, wherein the controller is further configured to control the display unit to display, to the wearer of the wearable electronic device, and superimposed on a map, the location icon and the merchant information identifying the merchant that offers the same item.

* * * * *